US012271119B2

(12) United States Patent
Kwon et al.

(10) Patent No.: US 12,271,119 B2
(45) Date of Patent: Apr. 8, 2025

(54) STRUCTURE TO POP UP TONER REFILL CARTRIDGE FROM MOUNTING PORTION

(71) Applicant: Hewlett-Packard Development Company, L.P., Spring, TX (US)

(72) Inventors: Youngjo Kwon, Seongnam Si (KR); Byeongno Jeong, Seongnam Si (KR); Joonggwang Shin, Seongnam Si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 18/292,848

(22) PCT Filed: Jan. 5, 2022

(86) PCT No.: PCT/US2022/070028
§ 371 (c)(1),
(2) Date: Jan. 26, 2024

(87) PCT Pub. No.: WO2023/023415
PCT Pub. Date: Feb. 23, 2023

(65) Prior Publication Data
US 2025/0004396 A1 Jan. 2, 2025

(30) Foreign Application Priority Data
Aug. 17, 2021 (KR) ........................ 10-2021-0107820

(51) Int. Cl.
*G03G 15/08* (2006.01)
*G03G 15/00* (2006.01)
*G03G 21/16* (2006.01)

(52) U.S. Cl.
CPC ..... *G03G 15/0867* (2013.01); *G03G 15/0886* (2013.01); *G03G 15/0889* (2013.01); *G03G 15/5016* (2013.01); *G03G 21/1647* (2013.01)

(58) Field of Classification Search
CPC ........... G03G 15/0865; G03G 15/0867; G03G 15/0886; G03G 15/0889; G03G 15/5016; G03G 21/1647
See application file for complete search history.

(56) References Cited

U.S. PATENT DOCUMENTS 5,610,692 A * 3/1997 Trask ................. G03G 15/0865 399/262
6,591,077 B2 * 7/2003 Yanagisawa ....... G03G 15/0865 222/DIG. 1

(Continued)

FOREIGN PATENT DOCUMENTS

EP 2778798 A1 9/2014
EP 1623280 B1 12/2017
KR 10-2019-0125106 A 11/2019

*Primary Examiner* — Sophia S Chen
(74) *Attorney, Agent, or Firm* — Foley & Lardner LLP

(57) ABSTRACT

A main body of an image forming apparatus includes a developing device, a mounting portion to or from which a toner refill cartridge is attachable or detachable and which is connected to the developing device to transfer a toner in the toner refill cartridge to the developing device. The main body has a housing provided with a communicating hole so that the toner refill cartridge is mountable on the mounting portion from the outside. The image forming apparatus includes the main body, a pop-up module to push the toner refill cartridge in a removal direction and pop up the toner refill cartridge from the mounting portion, and a controller to cause the toner refill cartridge to pop up by operating the pop-up module when refilling with the toner is completed.

15 Claims, 21 Drawing Sheets

(56) References Cited

U.S. PATENT DOCUMENTS

| | | | |
|---|---|---|---|
| 2007/0223947 A1 | 9/2007 | Ohkawa et al. | |
| 2017/0357206 A1 | 12/2017 | Minamikawa et al. | |
| 2019/0235413 A1 | 8/2019 | Kanno | |
| 2023/0152730 A1 * | 5/2023 | Kang ................. | G03G 15/0886 399/262 |

* cited by examiner

STRUCTURE TO POP UP TONER REFILL CARTRIDGE FROM MOUNTING PORTION

CROSS-REFERENCE TO RELATED APPLICATIONS

This application is a U.S. National Stage Patent Application under 35 U.S.C. § 371 of PCT/US2022/070028, filed Jan. 5, 2022, which claims priority to Korean Patent Application No. 10-2021-0107820, filed Aug. 17, 2021, which are hereby incorporated by reference in their entireties.

BACKGROUND

An image forming apparatus using an electrophotographic method supplies toner to an electrostatic latent image formed on a photoconductor to form a visible toner image on the photoconductor, transfers the toner image to a print medium via an intermediate transfer medium or directly, and then fixes the transferred toner image on the print medium.

A developing device stores a toner and supplies the toner to an electrostatic latent image formed on a photoconductor to form a visible toner image. When the toner in the developing device is completely consumed, the developing device is removed from a main body of the image forming apparatus, and a new developing device may be mounted on the main body. The developing device may be refilled with a new toner using a toner refill kit (toner refill cartridge).

BRIEF DESCRIPTION OF THE DRAWINGS

FIG. 4 shows a state in which a pop-up member is in an accommodation position, FIG. 5 shows a state in which a releasing lever is in a releasing position, and FIG. 6 shows a state in which the pop-up member is in a pop-up position.

FIG. 10 shows a state in which the discharge shutter is in a closed position, and FIG. 11 shows a state in which the discharge shutter is in an open position.

FIG. 12 shows a state in which the discharge shutter and the inlet shutter are respectively in a closed position and a toner blocking position, and FIG. 13 shows a state in which the discharge shutter and the inlet shutter are respectively in an open position and a toner inlet position.

FIG. 19 shows a state in which a toner refill cartridge is mounted on a mounting portion, and FIG. 20 shows a state in which the toner refill cartridge is popped up.

DETAILED DESCRIPTION

Figure 1:
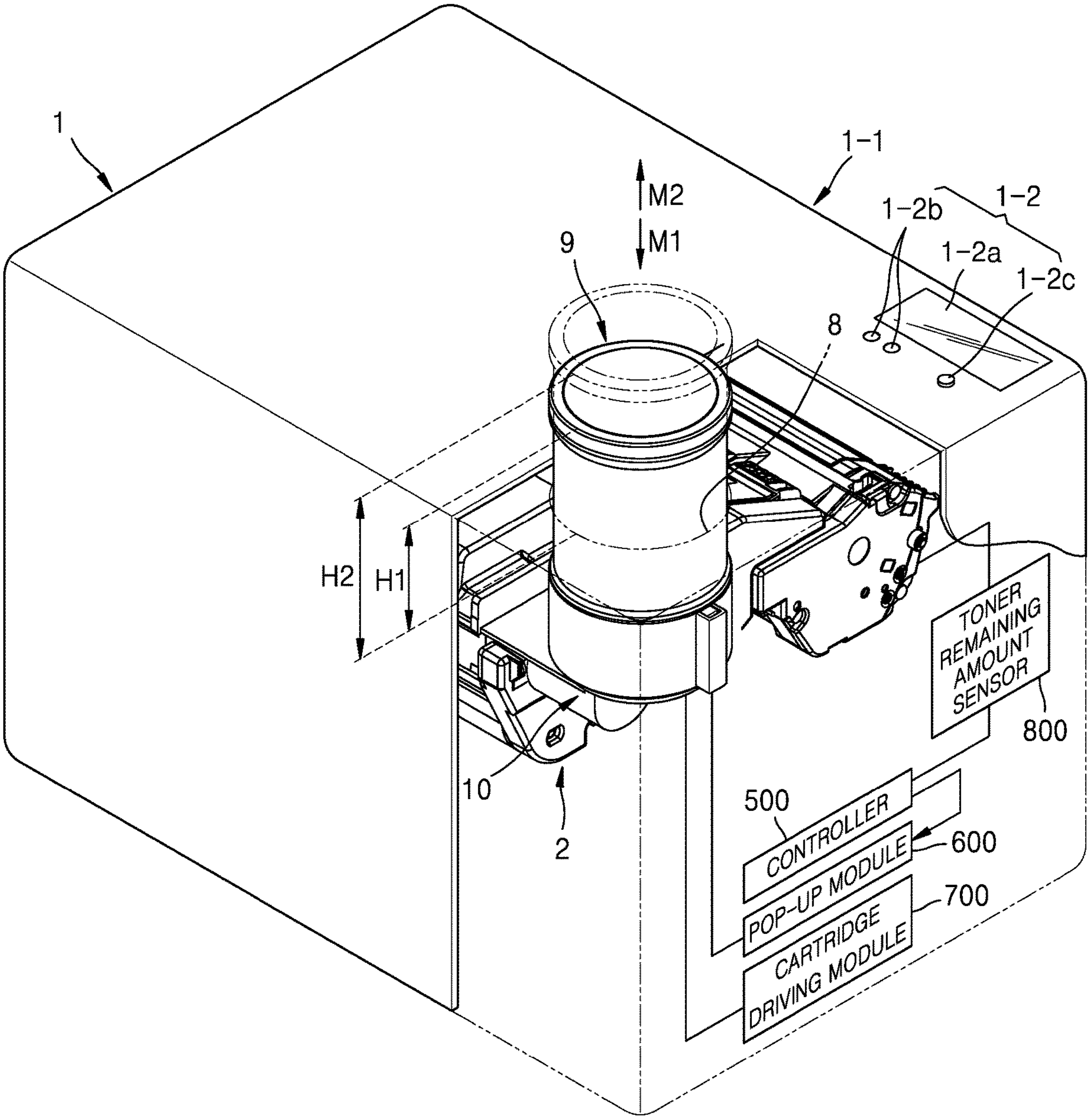
FIG. 1 is a schematic perspective view of an example of an image forming apparatus.

In order to refill a developing device with a toner, a toner refill cartridge may be mounted on a mounting portion provided in an image forming apparatus. The toner refill cartridge is provided with a discharge shutter that opens or closes a toner discharge hole. The mounting portion is provided with an inlet shutter that opens or closes a toner inlet hole. When the toner refill cartridge is mounted on the mounting portion, the discharge shutter is engaged with the inlet shutter. The discharge shutter receives a driving force from a main body of the image forming apparatus and opens the toner discharge hole. The inlet shutter is connected to the discharge shutter to open the toner inlet hole. A toner container of the developing device is refilled with the toner in the toner refill cartridge through the toner discharge hole of the toner refill cartridge and the toner inlet hole of the mounting portion. When refilling with the toner is completed, the discharge shutter and the inlet shutter are switched to closed positions, and the toner refill cartridge may be removed from the mounting portion. When the toner refill cartridge is removed from the mounting portion before refilling with the toner is completed, the toner may leak from the toner refill cartridge because the discharge shutter is in an open position, and a driving force transmission structure connecting the toner refill cartridge with the main body of the image forming apparatus may be damaged.

According to an image forming apparatus of the present examples, a structure for intuitively recognizing whether refilling with the toner is completed is employed. For example, the image forming apparatus may include a pop-up module that pops up the toner refill cartridge from the mounting portion by pushing the toner refill cartridge in a removal direction. A controller may operate the pop-up module to make the toner refill cartridge pop up from the mounting portion when refilling with the toner is completed. The toner refill cartridge is partially exposed from a housing of the main body of the image forming apparatus in a mounted state. A length of a portion of the toner refill cartridge exposed from the housing in a popped-up state is greater than a length thereof in the mounted state. Accordingly, a user may visually recognize that refilling with the toner is completed and remove the toner refill cartridge from the mounting portion.

For example, when the toner refill cartridge is mounted on the mounting portion, an elastic hook of the toner refill cartridge is caught by a locking step provided in the mounting portion, and thus the toner refill cartridge may be locked to the mounting portion. An example of the pop-up module may include a pop-up member provided in the mounting portion to be movable to an accommodation position where the toner refill cartridge located in a mounted position is supported and to a pop-up position where the toner refill cartridge is popped up from the mounting portion, an elastic member that applies, to the pop-up member, an elastic force in a direction toward the pop-up position, a releasing lever capable of moving between a standby position and a releasing position where the elastic hook is released from the locking step, and an actuator that drives the releasing lever.

For example, the toner refill cartridge may be selectively locked to the mounting portion by a locking member driven by a pop-up motor. When the pop-up motor rotates forwardly/reversely, the locking member may be rotated to a first position where the toner refill cartridge is locked to the mounting portion and a second position where locking is released. An example of the pop-up module may include a pop-up member installed on the locking member to pop up the toner refill cartridge from the mounting portion by pushing the toner refill cartridge in the removal direction when the pop-up motor is reversely rotated.

An example of a method of controlling an image forming apparatus may include refilling with toner from a toner refill cartridge to a developing device by driving a driving motor when the toner refill cartridge is mounted on a mounting portion, and popping up the toner refill cartridge from the mounting portion by pushing the toner refill cartridge in a direction opposite to a mounting direction, that is, a removal direction, when refilling with the toner is completed. The toner refill cartridge may be mounted on the mounting portion through a communicating hole provided in a housing of a main body of the image forming apparatus, and a length of a portion of the toner refill cartridge exposed from the housing in a popped-up state may be greater than a length thereof in a mounted state. The refilling with the toner may include switching a discharge shutter of the toner refill cartridge and an inlet shutter of the mounting portion to open positions by driving the driving motor in a forward direction, and rotating an agitating member of the toner refill cartridge. Prior to performing the popping up of the toner refill cartridge, a discharge shutter of the toner refill cartridge and an inlet shutter of the mounting portion may be closed by driving the driving motor in a reverse direction. An example of the method may include locking the toner refill cartridge to the mounting portion prior to performing the refilling, and releasing the locking of the toner refill cartridge prior to performing the popping up.

An example of the method may include identifying a remaining amount of the toner in the developing device prior to the refilling with the toner, and popping up the toner refill cartridge from the mounting portion when the identified remaining amount of the toner is greater than a reference remaining amount, which is the remaining amount of toner at which refill of the developing device is to be performed. When the identified remaining amount of the toner is greater than the reference remaining amount, a non-refillable state may be displayed on a user interface. When the identified remaining amount of the toner is less than the reference remaining amount, a refillable state may be displayed on the user interface. When the identified remaining amount of the toner is less than the reference remaining amount, a memory unit of the toner refill cartridge is checked to identify whether the toner refill cartridge is in a state suitable for refilling. If the toner refill cartridge is not in a state suitable for refilling, the toner refill cartridge is popped up from the mounting portion, and if the toner refill cartridge is in a state suitable for refilling, the toner may be supplied from the toner refill cartridge to the developing device. Hereinafter, examples of an image forming apparatus will be described with reference to the drawings. Members having the same function are denoted by the same reference numerals, and repeated descriptions thereof are omitted.

Figure 2:
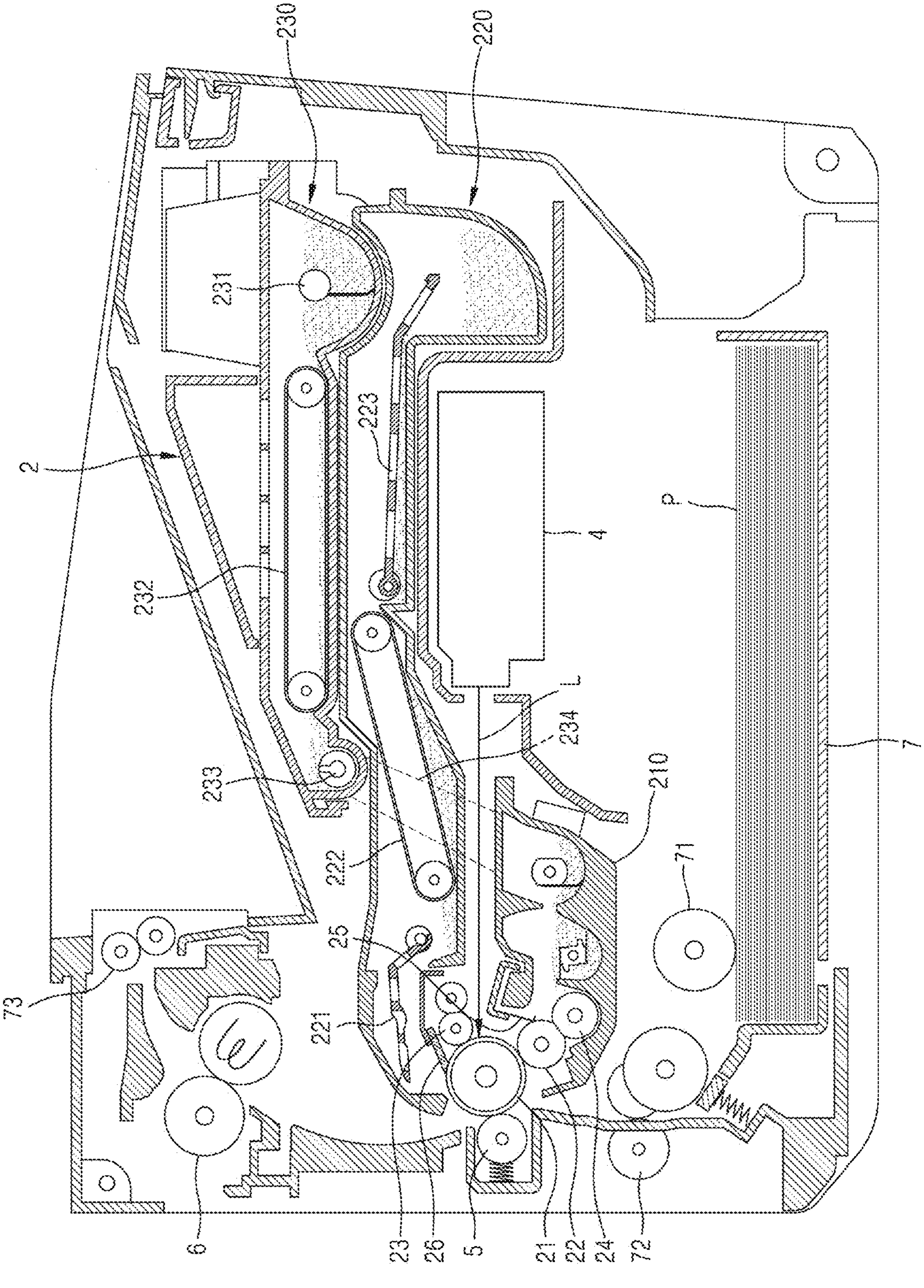
FIG. 2 is a schematic configuration diagram of an example of the image forming apparatus illustrated in FIG. 1.

FIG. 1 is a schematic perspective view of an example of an image forming apparatus. FIG. 2 is a schematic configuration diagram of an example of the image forming apparatus illustrated in FIG. 1. Referring to FIGS. 1 and 2, an example of the image forming apparatus may include a main body 1 of the image forming apparatus, a pop-up module 600, and a controller 500. The main body 1 may include a developing device 2 and a mounting portion 10 to or from which a toner refill cartridge 9 is attachable or detachable, respectively. The mounting portion 10 is connected to the developing device 2 to transfer the toner in the toner refill cartridge 9 to the developing device 2. The main body 1 includes a housing 1-1 provided with a communicating hole 8 so that the toner refill cartridge 9 may be mounted on the mounting portion 10 from the outside of the housing 1-1. The pop-up module 600 pushes and pops up the toner refill cartridge 9 mounted on the mounting portion 10 in a removal direction M2. The controller 500 causes the toner refill cartridge 9 to pop up from the mounting portion 10 by operating the pop-up module 600 when refilling of the developing device 2 with the toner is completed. When the toner refill cartridge 9 is mounted on the mounting portion 10, a cartridge driving module 700 is connected to the toner refill cartridge 9 and drives the toner refill cartridge 9.

The controller 500 may control an image forming process. The controller 500 may control a toner refilling process. The controller 500 may include one or more processors, for example, a central processing unit (CPU). The controller 500 may include a memory. The memory may store a control program and various control parameters for controlling the image forming apparatus. The main body 1 may be provided with a user interface 1-2. The user interface 1-2 may include an apparatus that displays visual or auditory information. For example, the user interface 1-2 may include a display 1-2*a*, a lighting apparatus 1-2*b*, and a beeper 1-2*c*. The lighting apparatus 1-2*b* may include, for example, one or more light-emitting diodes (LEDs). A toner remaining amount sensor 800 detects a remaining amount of the toner in the developing device 2. For example, the toner remaining amount sensor 800 may detect whether the remaining amount of the toner in the developing device 2 is less than a reference remaining amount, which is the remaining amount of toner in the developing device 2 at which refill of the developing device is to be performed. The toner remaining amount sensor 800 may be, for example, installed in a developing portion 210.

Referring to FIG. 2, the developing device 2 of some examples may include the developing portion 210 in which a photoconductive drum 21 and a developing roller 22 are installed, a waste toner container 220 that stores a waste toner removed from the photoconductive drum 21, and a toner container 230 that is connected to the developing portion 210 and stores a toner. The toner container 230 is connected to the mounting portion 10. The mounting portion 10 may be integrally formed with the developing device 2 to provide an interface between the toner refill cartridge 9 and the developing device 2. The waste toner removed from the photoconductive drum 21 by a cleaning member 26 is stored in the waste toner container 220. The waste toner is transported into the waste toner container 220 by one or more waste toner transporting members 221, 222, and 223. The toner container 230 is connected to the mounting portion 10 and stores a toner. The toner container 230 is connected to the developing portion 210 by a toner supplier 234 as shown by dashed lines in FIG. 2. The toner supplier 234 is located outside an effective scanning width of light L so as not to interfere with the light L scanned in a main scanning direction by an optical scanner 4. Toner conveying members 231, 232, and 233 for supplying toner to the developing portion 210 via the toner supplier 234 may be installed in the toner container 230.

The photoconductive drum 21 is an example of a photoconductor on which an electrostatic latent image is formed. A charging roller 23 is an example of a charger which charges a surface of the photoconductive drum 21 to have a uniform electric potential. A charging bias voltage is applied to the charging roller 23. The optical scanner 4 irradiates light modulated according to image information to the surface of the photoconductive drum 21 charged to the uniform electric potential. The optical scanner 4 can include, for example, a laser scanning unit (LSU), which scans the photoconductive drum 21 by deflecting light irradiated from a laser diode in a main scanning direction by using a polygon mirror. The developing roller 22 supplies toner to the electrostatic latent image formed on the surface of the photoconductive drum 21 to develop the electrostatic latent image. A supply roller 24 adheres the toner to the developing roller 22. A supply bias voltage may be applied to the supply roller 24 to attach the toner to the developing roller 22. When a developing bias voltage is applied to the developing roller 22, the toner is moved and attached to the electrostatic latent image formed on the surface of the photoconductive drum 21 via a development nip. A regulating member 25 regulates an amount of toner to be adhered to a surface of the developing roller 22. The cleaning member 26 removes residual toner and foreign materials from the surface of the photoconductive drum 21 prior to charging.

A transfer roller 5 is an example of a transfer unit which is located to face the photoconductive drum 21 to form a transfer nip. A transfer bias voltage is applied to the transfer roller 5 to transfer a toner image developed on the surface of the photoconductive drum 21 to a print medium P. The print medium P withdrawn from a loading tray 7 by a pick-up roller 71 is transported by a transporting roller 72 to the transfer nip where the transfer roller 5 and the photoconductive drum 21 face each other. The toner image transferred to a surface of the print medium P by the transfer roller 5 is held on the surface of the print medium P by electrostatic attraction. A fuser 6 forms a permanent print image on the print medium P by applying heat and pressure to the toner image to fix the toner image on the print medium P. The print medium P, on which printing is completed, is discharged to the outside of the main body 1 by a discharge roller 73.

When the toner in the developing device 2 is consumed, the developing device 2 may be refilled with a toner using the toner refill cartridge 9. The mounting portion 10 provides an interface between the toner refill cartridge 9 and the developing device 2 to refill the developing device 2 with the toner from the toner refill cartridge 9. Referring to FIG. 1, the housing 1-1 may be provided with the communicating hole 8 so that the toner refill cartridge 9 may be mounted on the mounting portion 10 from the outside of the main body 1. For example, the communicating hole 8 may be provided in an upper surface of the housing 1-1. The mounting portion 10 is located under the communicating hole 8. The toner refill cartridge 9 may be mounted on the mounting portion 10 through the communicating hole 8 by pushing the toner refill cartridge 9 from an upper side of the main body 1 in a mounting direction M1.

The toner refill cartridge 9 is provided with a discharge shutter 95 (in FIG. 7) that selectively allows toner to be discharged from the toner refill cartridge 9. The toner refill cartridge 9 may be provided with an agitating member 96 (in FIG. 7) that assists in discharging the toner from the toner refill cartridge 9. The discharge shutter 95 and the agitating member 96 may be driven in connection with the cartridge driving module 700. When the toner refill cartridge 9 is mounted on the mounting portion 10, the discharge shutter 95 and an inlet shutter 11 (in FIG. 12) of the mounting portion 10 may be connected to each other and operated together. The discharge shutter 95 and the inlet shutter 11 are switched to a state allowing discharge and inflow of toner, respectively, by the cartridge driving module 700. The agitating member 96 is rotated by the cartridge driving module 700, and the toner in the toner refill cartridge 9 may be supplied to the developing device 2 via the mounting portion 10. The agitating member 96 agitates the toner in the toner refill cartridge 9 and allows the toner to be easily discharged. When refilling of the developing device 2 with the toner from the toner refill cartridge 9 is completed, the discharge shutter 95 and the inlet shutter 11 are switched to a state blocking discharge and inflow of toner, respectively, by the cartridge driving module 700. Operations of the discharge shutter 95 and the inlet shutter 11 are described below with reference to FIGS. 7 to 13.

When refilling of the developing device 2 with the toner from the toner refill cartridge 9 is completed, the controller 500 may cause the toner refill cartridge 9 to pop up by driving the pop-up module 600. As shown by dashed lines in FIG. 1, the toner refill cartridge 9 is pushed in the removal direction M2 and popped up from the mounting portion 10. A length H2 of a portion of the toner refill cartridge 9 exposed from the housing 1-1 in a popped-up state is greater than a length H1 of the portion of the toner refill cartridge 9 in a mounted state. Thus, a user may visually recognize that refilling of the developing device 2 with the toner from the toner refill cartridge 9 is completed, and the toner refill cartridge 9 may be removed from the mounting portion 10.

Figure 3:
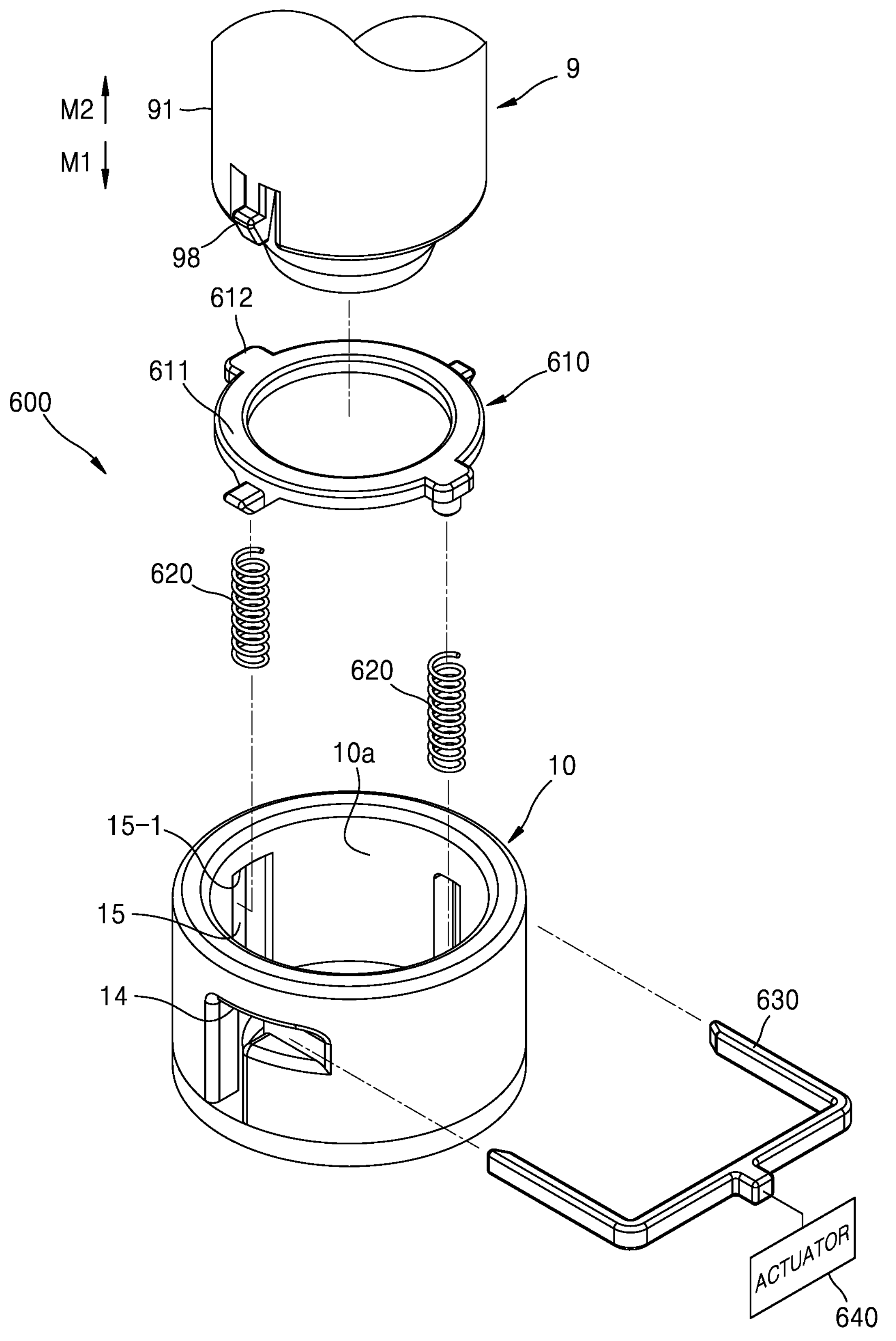
FIG. 3 is an exploded perspective view showing an example of a pop-up module.

FIG. 3 is an exploded perspective view showing an example of the pop-up module 600. Referring to FIG. 3, the toner refill cartridge 9 may be provided with an elastic hook 98. For example, the elastic hook 98 may protrude to the outside of a main body 91 of the toner refill cartridge 9. The mounting portion 10 may be provided with a locking step (or locking surface) 14. When the toner refill cartridge 9 is mounted on the mounting portion 10, the elastic hook 98 of the toner refill cartridge 9 is caught at the locking step 14 to lock the toner refill cartridge 9 in a mounted position. For example, as the toner refill cartridge 9 is moved in the mounting direction M1 and mounted on the mounting portion 10, when the elastic hook 98 is in contact with an inner wall 10*a* of the mounting portion 10, the elastic hook 98 is elastically deformed inwardly. When the toner refill cartridge 9 is moved to the mounted position on the mounting portion 10, the contact between the elastic hook 98 and the inner wall 10*a* is terminated, and the elastic hook 98 is caught by the locking step 14 while returning to its original position from the inwardly deformed position by an elastic restoring force. The toner refill cartridge 9 may be locked in the mounted position. An example of the pop-up module 600 may include a pop-up member 610 provided in the mounting portion 10. The pop-up member 610 is movable to an accommodation position where the toner refill cartridge 9 located in the mounted position is supported. The pop-up member 610 is movable to a pop-up position where the toner refill cartridge 9 is pushed in the removal direction M2. The pop-up module 600 includes an elastic member 620 that applies, to the pop-up member 610, an elastic force in a direction toward the pop-up position. The pop-up module 600 includes a releasing lever 630 capable of moving to a standby position and to a releasing position where the elastic hook 98 is released from the locking step 14. The pop-up module 600 includes an actuator 640 that drives the releasing lever 630.

The pop-up member 610 may be supported by the mounting portion 10. The pop-up member 610 is to be elevated or dropped in the mounting direction M1 or removal direction M2, respectively. For example, the pop-up member 610 may include a body 611 that supports the toner refill cartridge 9, and a wing portion 612 extending outwardly from the body 611. The mounting portion 10 has a slot 15 extending in the mounting direction M1 or removal direction M2. The wing portion 612 of the pop-up member 610 is inserted into the slot 15. The elastic member 620 is installed in the slot 15 between the wing portion 612 of the pop-up member 610 and the mounting portion 10, to apply an elastic force in the removal direction M2 to the pop-up member 610. For example, the elastic member 620 may include a compression coil spring. The wing portion 612 is caught by an upper edge 15-1 of the slot 15, and accordingly, the pop-up member 610 is not deviated from the mounting portion 10. The releasing lever 630 may be moved between the standby position and the releasing position. At the standby position, the releasing lever 630 is spaced apart from the elastic hook 98 of the toner refill cartridge 9. At the releasing position, the releasing lever 630 is to cause a release of the elastic hook 98 from the locking step 14. For example, in the releasing position, the releasing lever 630 engages with the elastic hook 98 to elastically deform the elastic hook 98 inwardly. The actuator 640 may include, for example, a solenoid, a linear motor, or the like that linearly moves the releasing lever 630 between the standby position and the releasing position.

Figure 4:
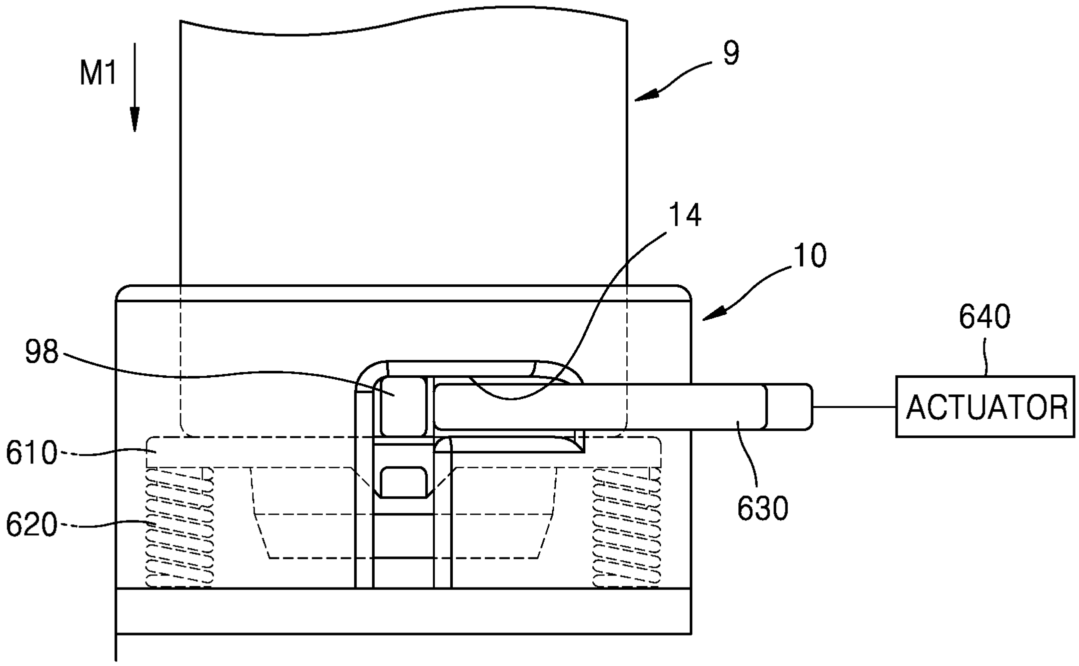
FIGS. 4 to 6 are diagrams showing operations of an example of the pop-up module illustrated in FIG. 3, where
Figure 5:
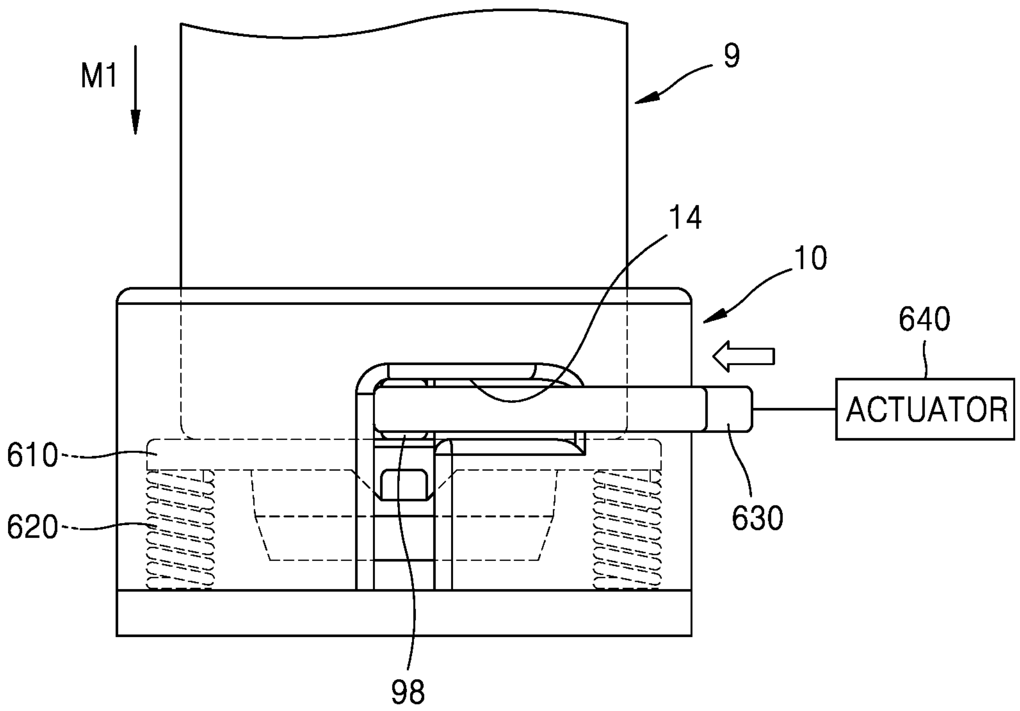
Figure 6:
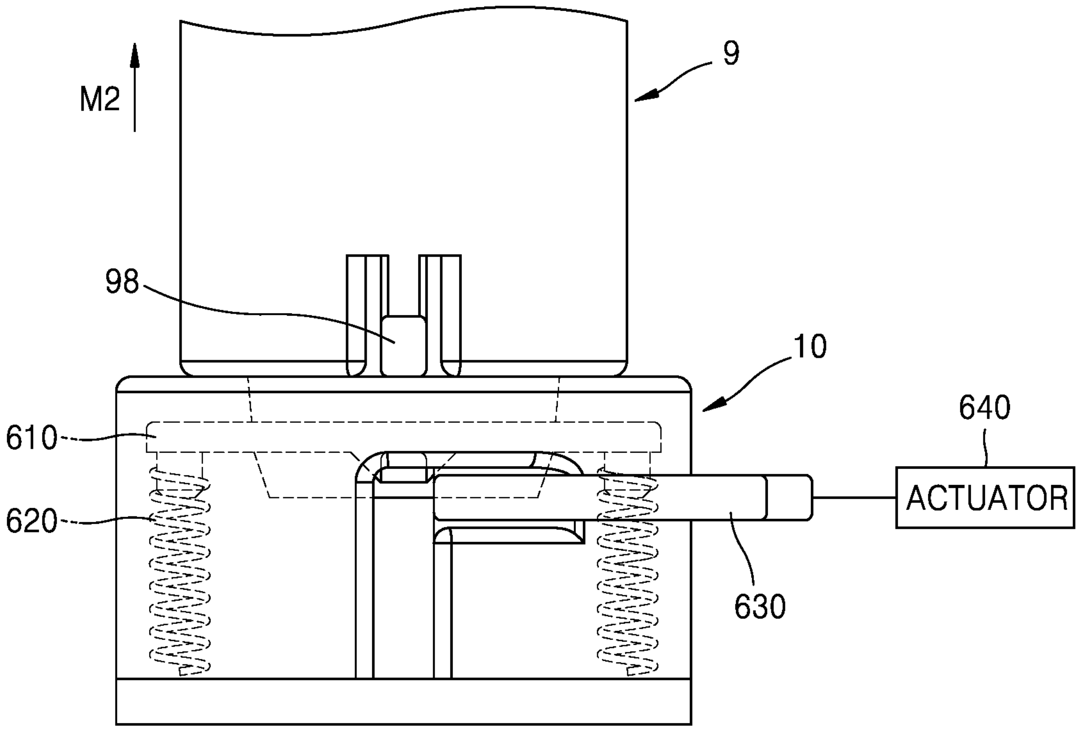

FIGS. 4 to 6 are diagrams showing operations of an example of the pop-up module 600 illustrated in FIG. 3, where FIG. 4 shows a state in which the pop-up member 610 is located in the accommodation position, FIG. 5 shows a state in which the releasing lever 630 is located in the releasing position, and FIG. 6 shows a state in which the pop-up member 610 is located in the pop-up position. First, referring to the FIG. 4, the releasing lever 630 is located in the standby position. When the toner refill cartridge 9 is mounted on the mounting portion 10, the pop-up member 610 is pushed by the toner refill cartridge 9 and moved in the mounting direction M1. The toner refill cartridge 9 reaches the mounted position, and the pop-up member 610 reaches the accommodation position of FIG. 4. The elastic hook 98 of the toner refill cartridge 9 is caught by the locking step 14 of the mounting portion 10, and the toner refill cartridge 9 is locked to the mounted position. In this state, the controller 500 switches the discharge shutter 95 and the inlet shutter 11 to a state allowing discharge and inflow of toner, respectively, and rotates the agitating member 96, by driving the cartridge driving module 700. The toner in the toner refill cartridge 9 is supplied to the developing device 2 via the mounting portion 10.

When refilling of the developing device 2 with the toner from the toner refill cartridge 9 is completed, the controller 500 switches the discharge shutter 95 and the inlet shutter 11 to a state blocking discharge and inflow of toner, respectively, by driving the cartridge driving module 700. Then, the controller 500 moves the releasing lever 630 from the standby position of FIG. 4 to the releasing position of FIG. 5 by driving the actuator 640. When the releasing lever 630 reaches the releasing position, the releasing lever 630 pushes the elastic hook 98 to elastically deform the elastic hook 98 inwardly as shown in FIG. 5. As a result, the elastic hook 98 is released from the locking step 14. While the pop-up member 610 is pushed in the removal direction M2 by an elastic force of the elastic member 620, the toner refill cartridge 9 is pushed in the removal direction M2 and popped up from the mounting portion 10. When the pop-up member 610 reaches the pop-up position as shown in FIG. 6, the wing portion 612 is caught by the upper edge 15-1 of the slot 15. The actuator 640 may return the releasing lever 630 to the standby position, as shown in FIG. 6.

Figure 7:
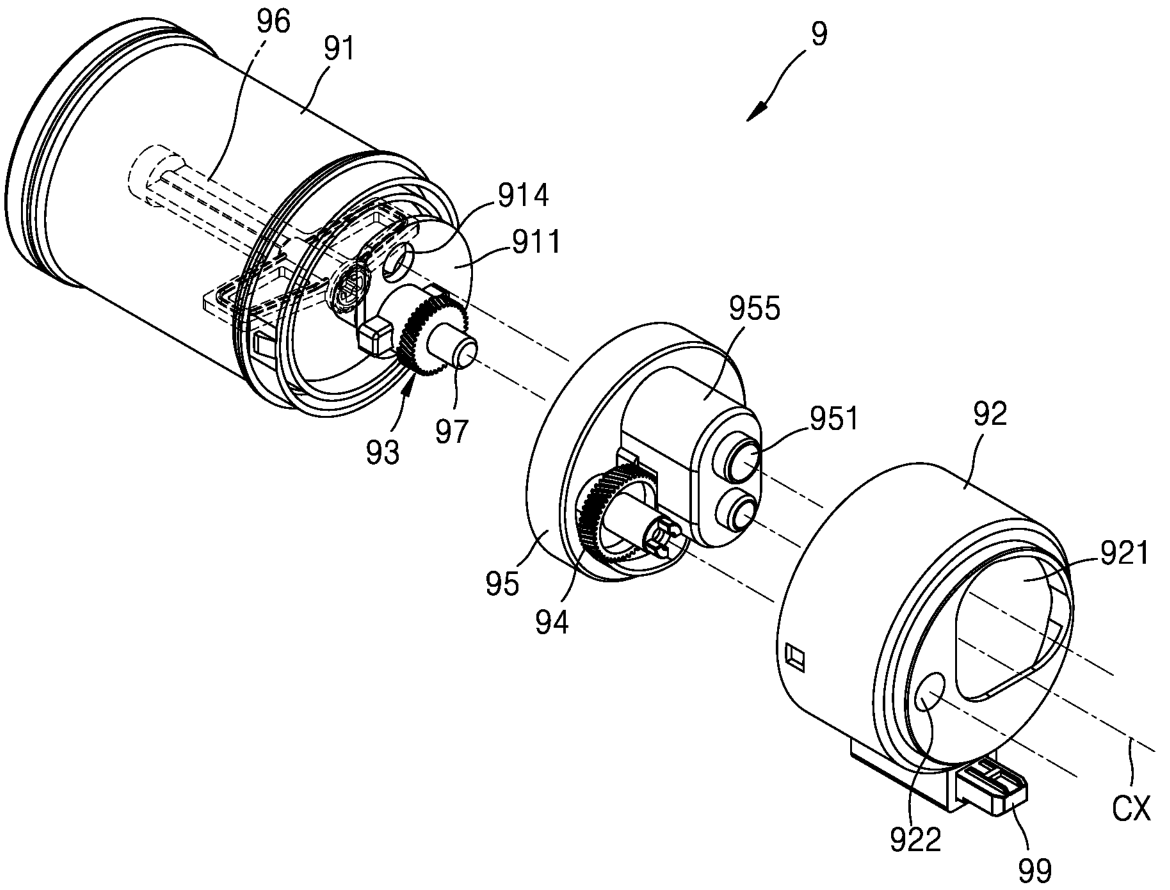
FIG. 7 is a schematic exploded perspective view of an example of a toner refill cartridge.
Figure 8:
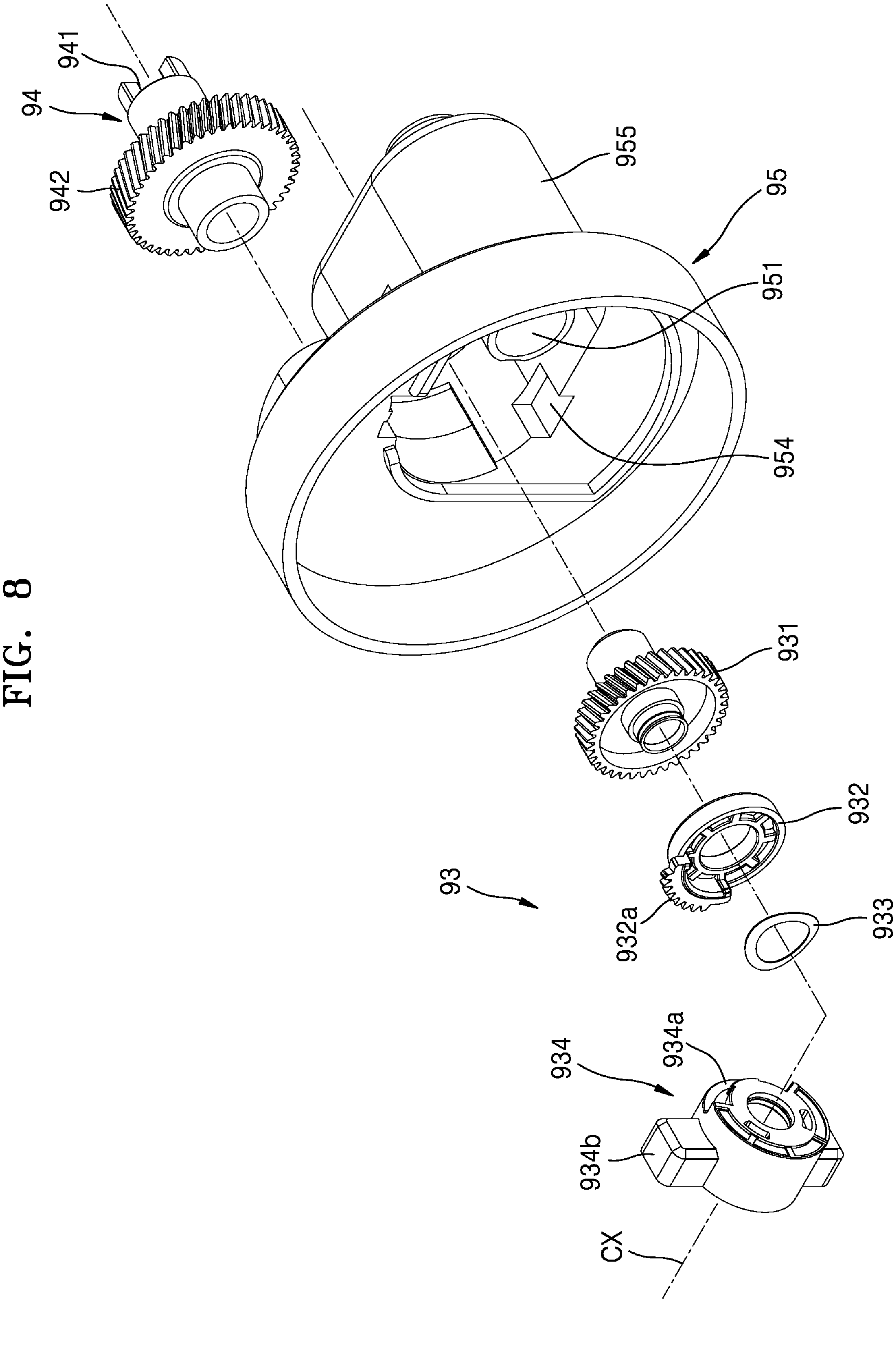
FIG. 8 is a schematic exploded perspective view of an example of a connecting member illustrated in FIG. 7.

Hereinafter, an example of the toner refill cartridge 9 and structures and operations of the discharge shutter 95 of the toner refill cartridge 9 and the inlet shutter 11 of the mounting portion 10 will be described. FIG. 7 is a schematic exploded perspective view of an example of the toner refill cartridge 9. FIG. 8 is a schematic exploded perspective view of an example of a connecting member 93 illustrated in FIG. 7. A structure related to the pop-up module 600 is omitted in FIGS. 7 and 8.

Referring to FIGS. 7 and 8, the toner refill cartridge 9 includes the main body 91, the discharge shutter 95, a coupler 94, and the connecting member 93. The main body 91 stores a toner, and includes a toner discharge hole 914 through which the toner is discharged. A cover 92 is coupled to a front end portion of the main body 91. The agitating member 96 receives rotation power from the coupler 94 to rotate in the main body 91, and agitates the toner in the main body 91 to expand voids between the toner to increase fluidity of the toner. The coupler 94 is connected to the agitating member 96 via a driving shaft 97. The discharge shutter 95 is coupled to the main body 91 to be rotatable with respect to a central shaft CX of the main body 91 to open/close the toner discharge hole 914. The toner discharge hole 914 may be located such that the toner discharge hole 914 is deviated in a radial direction from the central shaft CX. The discharge shutter 95 may be provided with an opening portion 951 deviated in the radial direction from the central shaft CX. When the discharge shutter 95 rotates with respect to the central shaft CX, the toner discharge hole 914 and the opening portion 951 may be misaligned from each other or aligned with each other according to a rotational phase. A sealing member 911 is between the discharge shutter 95 and the toner discharge hole 914 to prevent toner leakage, and rotates with the discharge shutter 95. The opening portion 951 of the discharge shutter 95 is exposed to the outside via a fan-shaped first opening 921 provided in the cover 92. The coupler 94 is exposed to the outside via a second opening 922 provided in the cover 92. When the toner refill cartridge 9 is mounted on the mounting portion 10, the coupler 94 is connected to the cartridge driving module 700.

The discharge shutter 95 is rotated in a rotational direction between an open position and a closed position for opening and closing, respectively, the toner discharge hole 914. The discharge shutter 95 is provided with an insertion portion 955 inserted into the first opening 921, and the opening portion 951 is provided in the insertion portion 955. When the discharge shutter 95 is in the open position, the insertion portion 955 is in contact with one edge of the first opening 921 and the discharge shutter 95 is blocked from being rotated beyond the open position. When the discharge shutter 95 is in the closed position, the insertion portion 955 is in contact with another edge of the first opening 921 and the discharge shutter 95 is blocked from being rotated beyond the closed position.

The coupler 94 drives the discharge shutter 95 and the agitating member 96. The coupler 94 is connected to the discharge shutter 95 and the agitating member 96 by the connecting member 93. The connecting member 93 may include a driven gear 931, a rotation member 932, a friction force providing member 933, and a link member 934. The driven gear 931 is installed on the driving shaft 97 and connected to the coupler 94. The agitating member 96 is connected to the driving shaft 97. When the driven gear 931 is rotated, rotation power of the driven gear 931 is transmitted to the agitating member 96 through the driving shaft 97 and the agitating member 96 may be rotated. The rotation member 932 is supported by the driven gear 931 so as to be rotated coaxially with the driven gear 931. The rotation member 932 includes a partial gear portion 932*a* corresponding to a rotation angle (e.g., about 90 degrees) between the open position and the closed position of the discharge shutter 95. The partial gear portion 932*a* may protrude from the rotation member 932 toward the link member 934. The link member 934 may be provided with a concave accommodation portion 934*a* so that the partial gear portion 932*a* may be accommodated therein. Thus, when the rotation member 932 is rotated, the link member 934 may also be rotated. The link member 934 is connected to the discharge shutter 95 to rotate the discharge shutter 95. For example, the link member 934 is provided with a protruding portion 934*b*, and the discharge shutter 95 may be provided with a concave portion 954 having a shape complementary to the protruding portion 934*b*. The protruding portion 934*b* is inserted into the concave portion 954. According to this configuration, when the link member 934 is rotated, the discharge shutter 95 may also be rotated. The friction force providing member 933 elastically presses the rotation member 932 to the driven gear 931 to provide a rotational friction force between the rotation member 932 and the driven gear 931. Thus, even in a case where a gear portion 942 of the coupler 94 is not engaged with the partial gear portion 932*a* of the rotation member 932, when the driven gear 931 is rotated, the rotation member 932 may also be rotated. When the rotation member 932 is no longer rotated, a slip occurs between the rotation member 932 and the driven gear 931, and the driven gear 931 may be rotated in a state in which the rotation member 932 is stopped.

Figure 9:
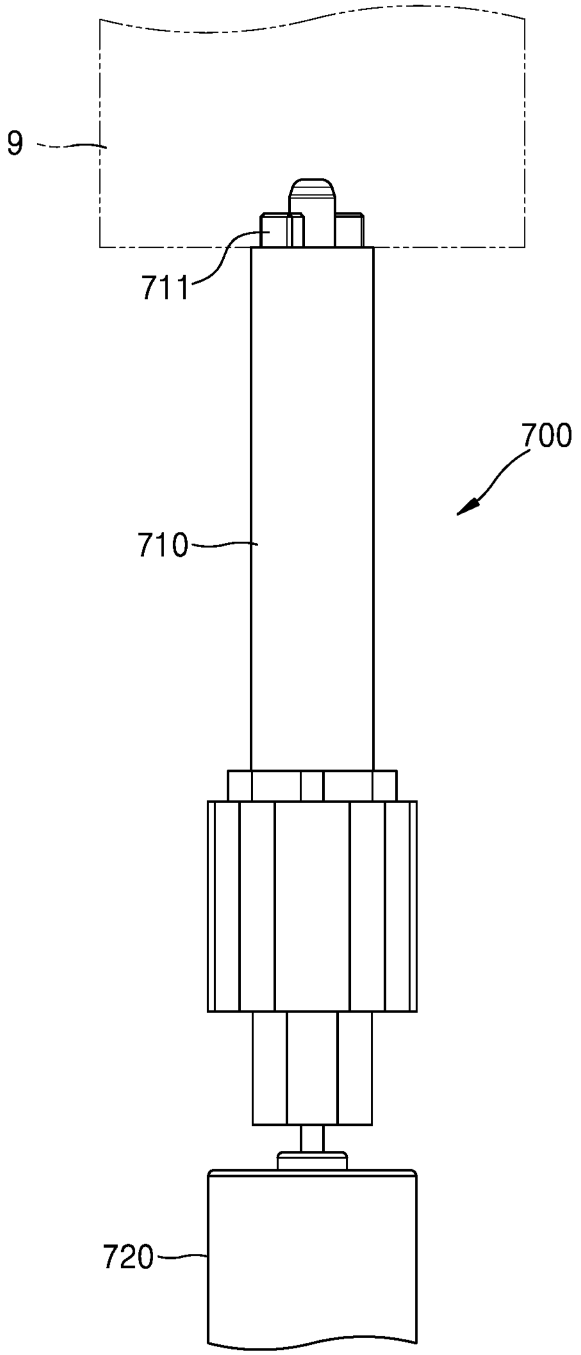
FIG. 9 is a front view of an example of a cartridge driving module.

As described above, when the toner refill cartridge 9 is mounted on the mounting portion 10, the coupler 94 is connected to the cartridge driving module 700. FIG. 9 is a front view of an example of the cartridge driving module 700. Referring to FIG. 9, the cartridge driving module 700 may include a rotation power transmitting member 710 including a rotation power transmitting portion 711 that transmits rotation power to the toner refill cartridge 9 mounted on the mounting portion 10, and a driving motor 720 that rotates the rotation power transmitting member 710. When the toner refill cartridge 9 is mounted on the mounting portion 10, a rotation power receiving portion 941 (in FIG. 8) of the coupler 94 and the rotation power transmitting portion 711 may be engaged with each other. Rotation power of the driving motor 720 may be transmitted to the discharge shutter 95 and the agitating member 96 through the rotation power transmitting portion 711 and the coupler 94.

Figure 10:
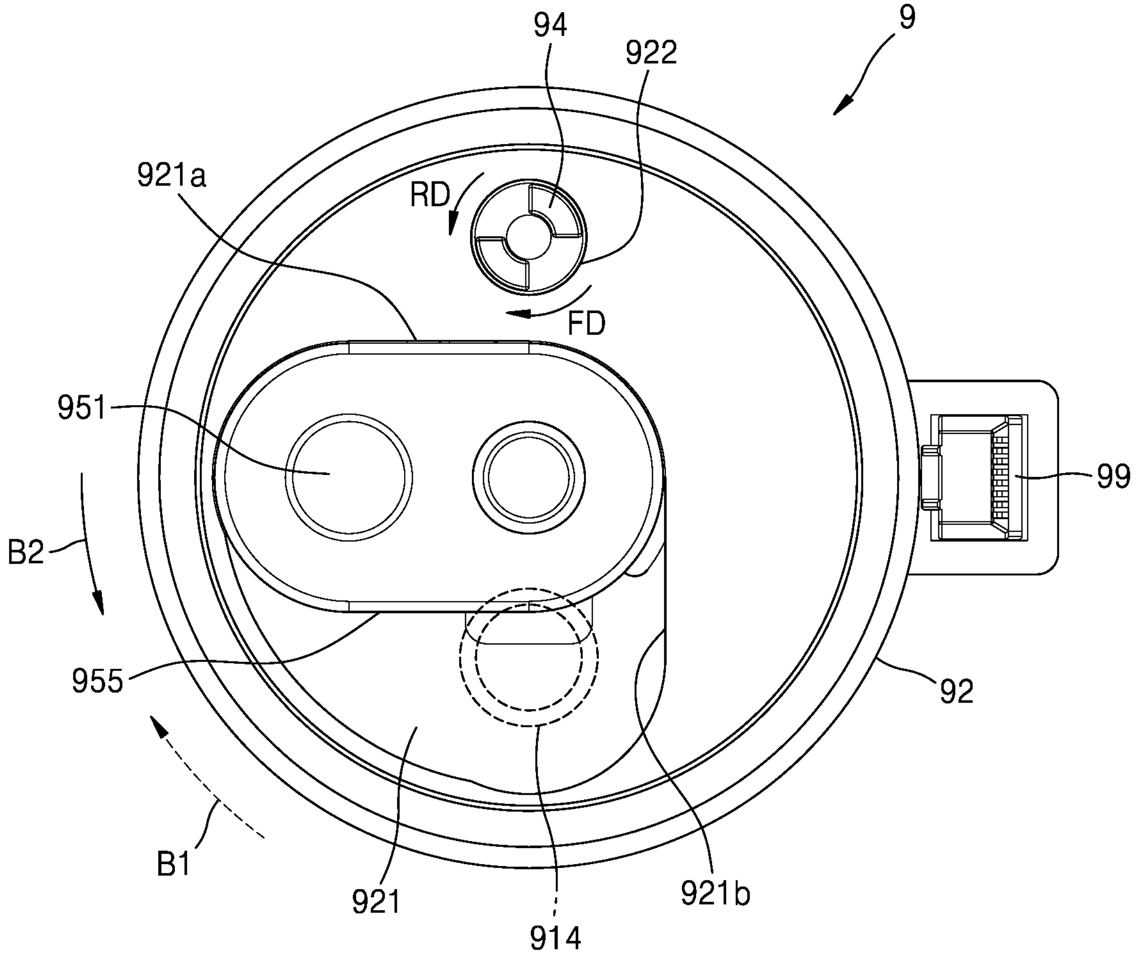
FIGS. 10 and 11 are plan views showing operations of a discharge shutter, where
Figure 11:
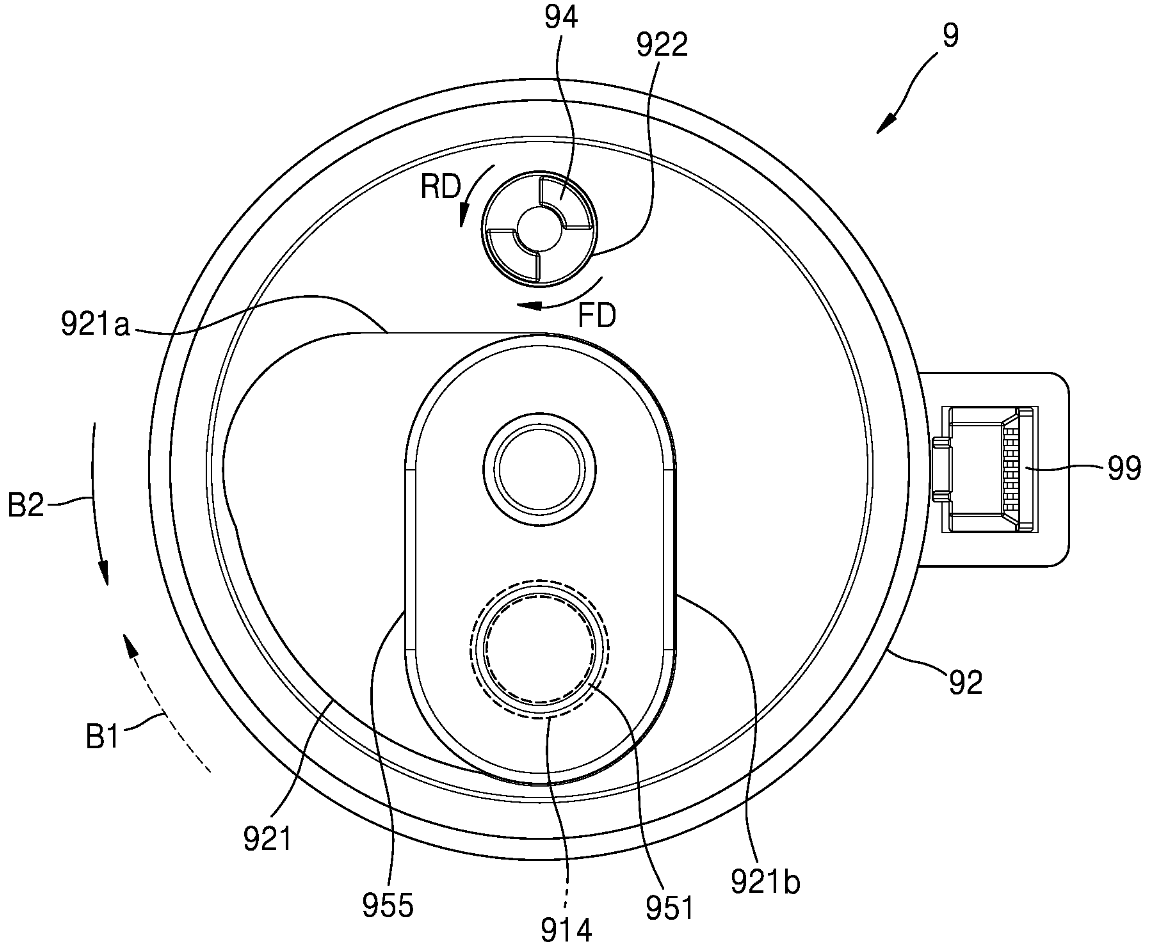

FIGS. 10 and 11 are plan views showing operations of the discharge shutter 95, where FIG. 10 shows a state in which the discharge shutter 95 is in the closed position, and FIG. 11 shows a state in which the discharge shutter 95 is located in the open position. First, referring to FIG. 10, the opening portion 951 is located to be misaligned from the toner discharge hole 914, and thus, the toner discharge hole 914 is in a closed state. The driven gear 931 is engaged with the gear portion 942 of the coupler 94, and the partial gear portion 932*a* of the rotation member 932 is not engaged with the gear portion 942. In this state, when the coupler 94 is rotated in a reverse direction RD, due to a friction force provided by the friction force providing member 933, rotation power in a direction B1 is applied to the discharge shutter 95 through the rotation member 932 and the link member 934. Because the insertion portion 955 of the discharge shutter 95 is inserted into the first opening 921 of the cover 92 and the insertion portion 955 is in contact with a first stopper 921*a*, the discharge shutter 95 is not rotated. Thus, the rotation member 932 is not rotated. A slip occurs between the driven gear 931 and the rotation member 932, and the driven gear 931 is rotated in the direction B1. The agitating member 96 is connected to the driven gear 931, and thus, is rotated in the direction B1.

When the coupler 94 is rotated in a forward direction FD in the state shown in FIG. 10, rotation power in a direction B2 is applied to the driven gear 931. Due to a friction force provided by the friction force providing member 933, the rotation power in the direction B2 is applied to the discharge shutter 95 through the rotation member 932 and the link member 934. Rotation of the discharge shutter 95 in the direction B2 is allowed. The driven gear 931, the rotation member 932, the link member 934, and the discharge shutter 95 are rotated in the direction B2. When the partial gear portion 932*a* is engaged with the gear portion 942, the rotation member 932, the link member 934, and the discharge shutter 95 are rotated in the direction B2.

When the discharge shutter 95 reaches the open position as shown in FIG. 11, the engagement between the partial gear portion 932*a* and the gear portion 942 is terminated. The insertion portion 955 of the discharge shutter 95 is in contact with a second stopper 921*b*, and the discharge shutter 95 is no longer rotated and maintained in a second position. The opening portion 951 of the discharge shutter 95 and the toner discharge hole 914 are aligned with each other to open the toner discharge hole 914. A slip occurs between the driven gear 931 and the rotation member 932, the driven gear 931 is rotated in the direction B2, and the agitating member 96 is rotated in the direction B2 because the agitating member 96 is connected to the driven gear 931. Toner is supplied from the main body 91 to the mounting portion 10 through the toner discharge hole 914 and the opening portion 951. A structure of the inlet shutter 11 of the mounting portion 10 will be described below.

When refilling with toner is completed, the discharge shutter 95 is switched back to the closed position. The coupler 94 is rotated in the reverse direction RD in the state shown in FIG. 11. The rotation power in the direction B1 is applied to the driven gear 931. Due to a friction force provided by the friction force providing member 933, the rotation power in the direction B1 is applied to the discharge shutter 95 through the rotation member 932 and the link member 934. In the state shown in FIG. 11, rotation of the discharge shutter 95 in the direction B1 is allowed. The driven gear 931, the rotation member 932, the link member 934, and the discharge shutter 95 are rotated in the direction B1. When the partial gear portion 932*a* is engaged with the gear portion 942, the rotation member 932, the link member 934, and the discharge shutter 95 are rotated in the direction B1 by the gear portion 942. When the discharge shutter 95 reaches the closed position shown in FIG. 10, the insertion portion 955 of the discharge shutter 95 is in contact with the first stopper 921*a*, and the discharge shutter 95 is maintained in the closed position.

Figure 12:
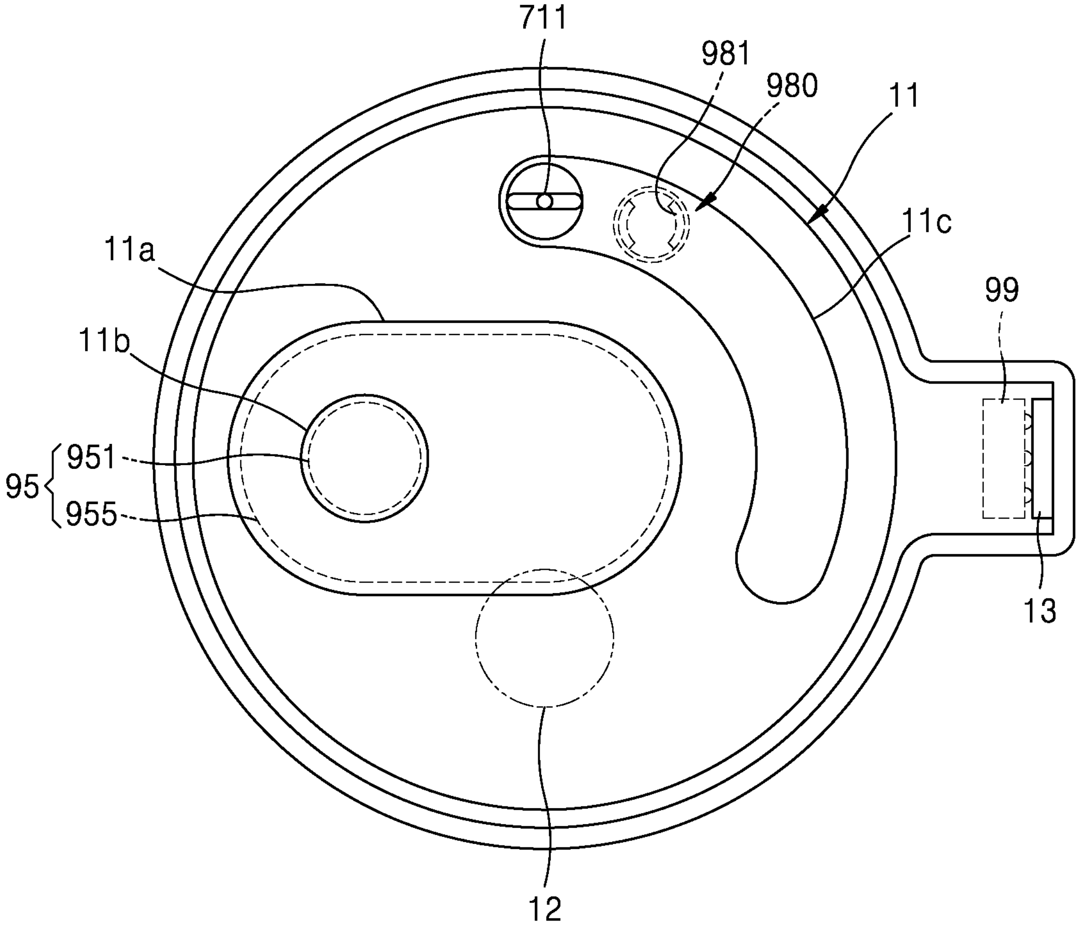
FIGS. 12 and 13 are schematic plan views showing operations of a discharge shutter and an inlet shutter, where
Figure 13:
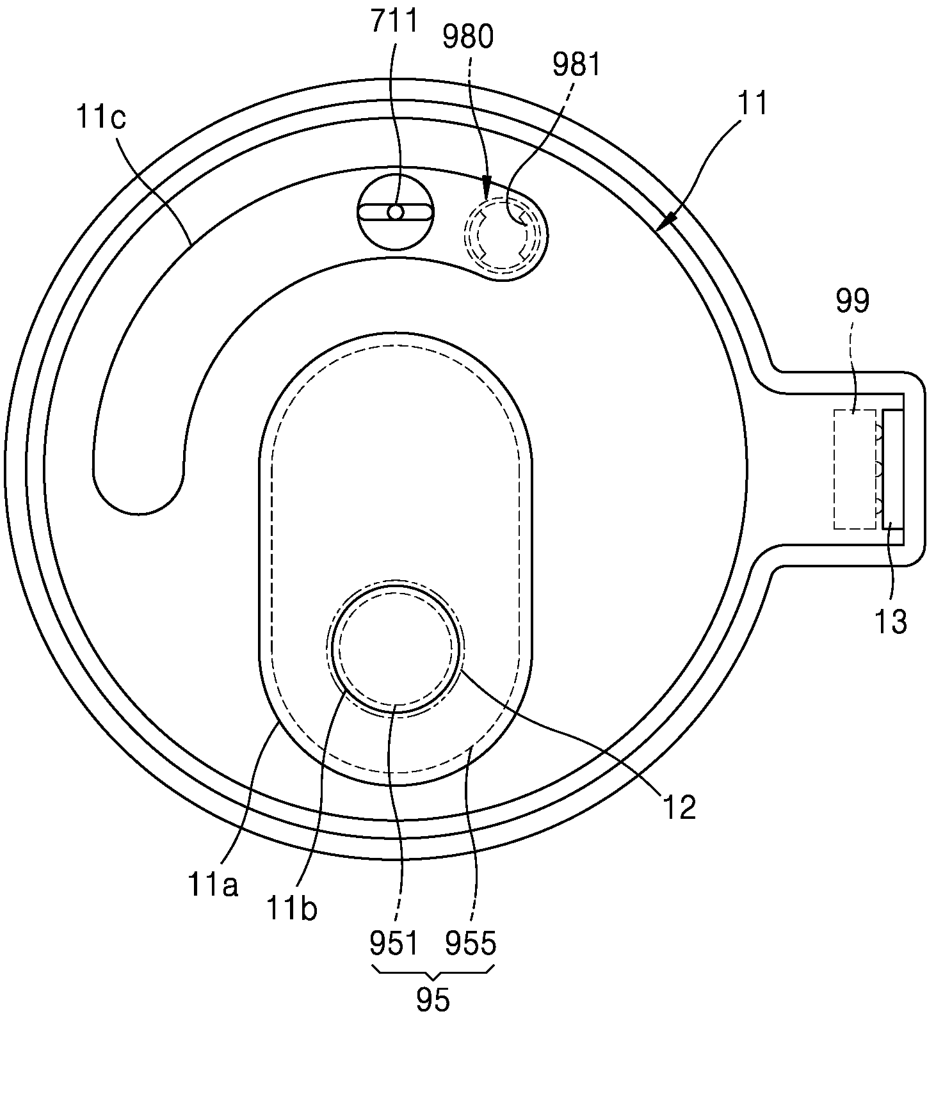

FIGS. 12 and 13 are schematic plan views showing operations of the discharge shutter 95 and the inlet shutter 11. FIG. 12 shows a state in which the discharge shutter 95 and the inlet shutter 11 are respectively located in the closed position and a toner blocking position, and FIG. 13 shows a state in which the discharge shutter 95 and the inlet shutter 11 are respectively located in the open position and a toner inlet position. A structure related to the pop-up module 600 is omitted in FIGS. 12 and 13. Referring to FIGS. 12 and 13, the mounting portion 10 is provided with an inlet hole 12 communicated with the developing device 2 and the inlet shutter 11 that opens or closes the inlet hole 12. The inlet shutter 11 includes an opening portion 11*b*. When the toner refill cartridge 9 is mounted on the mounting portion 10, the opening portion 11*b* of the inlet shutter 11 is aligned with the opening portion 951 of the discharge shutter 95. The inlet shutter 11 may be rotated to the toner blocking position (in FIG. 12) where the opening portion 11*b* and the inlet hole 12 are misaligned, and to the toner inlet position (in FIG. 13) where the opening portion 11*b* and the inlet hole 12 are aligned with each other.

The inlet shutter 11 of the present example is engaged with the discharge shutter 95 of the toner refill cartridge 9 and switched to the toner blocking position and the toner inlet position together with rotation of the discharge shutter 95. The inlet shutter 11 may be supported by the mounting portion 10 so as to be rotated to the toner inlet position and the toner blocking position. The inlet shutter 11 may be provided with an engaging portion 11*a* having a shape complementary to the discharge shutter 95, for example, the insertion portion 955. When the toner refill cartridge 9 is mounted on the mounting portion 10, the insertion portion 955 of the discharge shutter 95 is inserted into the engaging portion 11*a*, and when the discharge shutter 95 is rotated to the closed position and the open position, the inlet shutter 11 may also be rotated to the toner blocking position and the toner inlet position, respectively, together with the discharge shutter 95. The rotation power transmitting portion 711 of the cartridge driving module 700 may be engaged with the rotation power receiving portion 941 of the coupler 94 provided in the toner refill cartridge 9 via an incised portion 11*c* provided in the inlet shutter 11. Thus, the discharge shutter 95 and the inlet shutter 11 may be driven together by the cartridge driving module 700. Accordingly, the discharge shutter 95 and the agitating member 96 of the toner refill cartridge 9 and the inlet shutter 11 of the mounting portion 10 may be driven by one driving motor 720.

Referring to FIG. 12, the discharge shutter 95 is in the closed position, and the inlet shutter 11 is in the toner blocking position. The opening portion 11*b* of the inlet shutter 11 is aligned with the opening portion 951 of the discharge shutter 95 and misaligned from the inlet hole 12. For example, when the driving motor 720 is rotated in the forward direction FD, rotation power of the driving motor 720 in the forward direction FD is transmitted to the discharge shutter 95 by the rotation power transmitting member 710. When the discharge shutter 95 is rotated to the open position, the inlet shutter 11 is rotated to the toner inlet position together with the discharge shutter 95. As shown in FIG. 13, the discharge shutter 95 and the inlet shutter 11 respectively reach the open position and the toner inlet position. The opening portion 951 of the discharge shutter 95 is aligned with the toner discharge hole 914 of the main body 91. The opening portion 11*b* of the inlet shutter 11 is aligned with the opening portion 951 of the discharge shutter 95 and the inlet hole 12 of the mounting portion 10. Thus, toner may be supplied from the toner refill cartridge 9 to the mounting portion 10 through the toner discharge hole 914, the opening portion 951, the opening portion 11*b*, and the inlet hole 12. The rotation power of the driving motor 720 in the forward direction FD is transmitted to the agitating member 96 through the rotation power transmitting member 710, and while the agitating member 96 is rotated, increases fluidity of toner in the main body 91. Thus, the toner may be easily discharged from the main body 91. The toner supplied to the mounting portion 10 through the inlet hole 12 is supplied to the toner container 230 of the developing device 2, and is conveyed to the developing portion 210 by the toner conveying members 231, 232, and 233. When refilling with toner is completed, for example, the driving motor 720 is rotated in the reverse direction RD, and rotation power of the driving motor 720 in the reverse direction RD is transmitted to the discharge shutter 95 by the rotation power transmitting member 710. The discharge shutter 95 is rotated back to the closed position, and the inlet shutter 11 is rotated to the toner blocking position together with the discharge shutter 95.

Referring back to FIG. 7, the toner refill cartridge 9 may include a memory unit 99. When the toner refill cartridge 9 is mounted on the mounting portion 10, the memory unit 99 is electrically connected to the main body 1 and may transmit information of the toner refill cartridge 9 to the main body 1, for example, the controller 500. In the present example, the memory unit 99 is electrically connected to the main body 1 through a connecting portion 13 (FIG. 12) provided in the mounting portion 10. The controller 500 may determine whether the toner refill cartridge 9 is mounted according to whether the controller 500 is electrically connected to the memory unit 99, for example, whether communication with the memory unit 99 is possible.

The memory unit 99 may include a circuit portion for monitoring or managing a state of the toner refill cartridge 9 and an electrical contact portion for connection with the main body 1. The circuit portion may be provided with, for example, a customer replaceable unit monitor (CRUM) including a CPU that performs at least one of authentication and/or encrypted data communication with the main body 1 using its own operating system (O/S). The circuit portion may further include a memory. The memory may store various types of information about the toner refill cartridge 9. For example, the memory may store information about a manufacturer, information about a date of manufacture, intrinsic information such as a serial number, a model name, and the like, various programs, electronic signature information, and information about a usage state (whether the toner refill cartridge is used or not). The circuit portion may include a functional block capable of performing various functions for communication, authentication, encryption, and the like with the main body 1. The circuit portion may be implemented in the form of a chip including a CPU, in the form of a chip including a memory and a CPU, or in the form of a printed circuit board on which circuit elements for implementing a chip and various functional blocks are mounted. The electrical contact portion may have various forms capable of electrical connection with the main body 1, such as a conductive pattern form, a modular jack form, a flexible terminal form, and the like. For example, the electrical contact portion may include a first electrical contact point for transmitting a signal regarding whether the toner refill cartridge 9 is mounted on the mounting portion 10 to the main body 1, a second electrical contact point for transmitting information about the toner refill cartridge 9 for authentication to the main body 1, and a third electrical contact point for transmitting a toner discharge completion signal to the main body 1 by being connected with a discharge completion detection sensor (not shown) provided in the toner refill cartridge 9.

Figure 14:
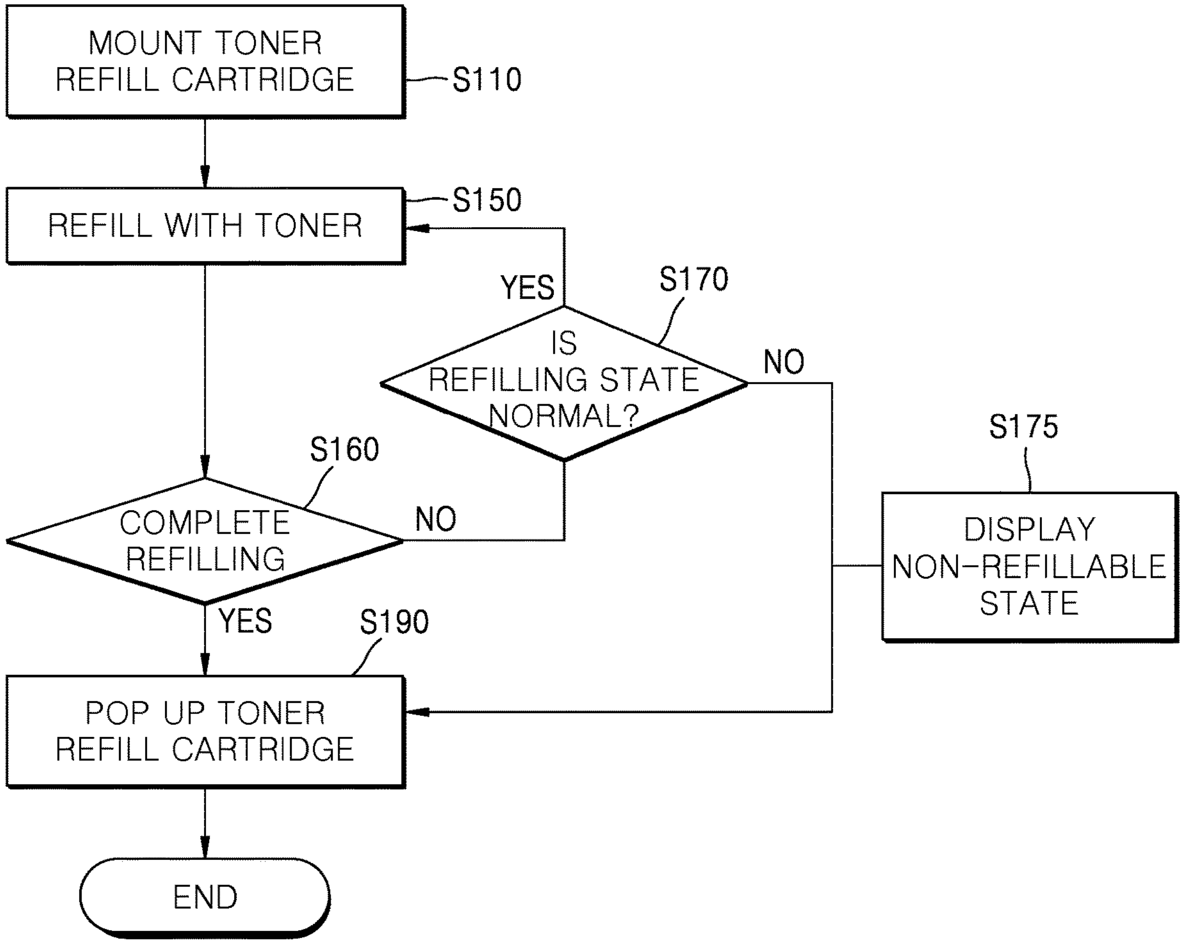
FIG. 14 is a flowchart showing an example of a method of controlling an image forming apparatus.

FIG. 14 is a flowchart showing an example of a method of controlling an image forming apparatus. Hereinafter, referring to FIGS. 1 to 13 and the flowchart of FIG. 14, an example of a method of controlling an image forming apparatus for refilling with toner will be described. Referring to FIG. 14, an example of a method of controlling an image forming apparatus may include, when the toner refill cartridge 9 is mounted (S110) on the mounting portion 10 of the image forming apparatus, refilling the developing device 2 with toner from the toner refill cartridge 9 by driving the driving motor 720 (S150), and when the refilling of the developing device 2 with the toner from the toner refill cartridge 9 is completed (as determined at S160), the toner refill cartridge 9 is popped up (S190) from the mounting portion 10 by pushing the toner refill cartridge 9 in a direction opposite to the mounting direction M1, that is, the removal direction M2.

The toner refill cartridge 9 may be mounted on the mounting portion 10 by being inserted into the communicating hole 8 provided in the main body 1 and pushed in the mounting direction M1. Then, as shown in FIG. 4, while the elastic hook 98 provided in the toner refill cartridge 9 is caught by the locking step 14 provided in the mounting portion 10, the toner refill cartridge 9 is mounted on and locked to the mounting portion 10. The pop-up member 610 is located in the accommodation position and supports the toner refill cartridge 9 located in the mounted position. As shown in FIG. 12, the discharge shutter 95 of the toner refill cartridge 9 and the inlet shutter 11 of the mounting portion 10 are engaged with each other. The memory unit 99 of the toner refill cartridge 9 is electrically connected to the connecting portion 13 provided in the mounting portion 10. For example, the memory unit 99 may transmit, to the controller 500, an electrical signal indicating that the toner refill cartridge 9 is mounted on the mounting portion 10 via the first electrical contact point.

The controller 500 opens the discharge shutter 95 and the inlet shutter 11 by driving the cartridge driving module 700, and causes toner to be supplied to the developing device 2 by rotating the agitating member 96. For example, the controller 500 drives the driving motor 720 in the forward direction FD in the state shown in FIGS. 10 and 12. Then, as shown in FIGS. 11 and 13, the discharge shutter 95 is rotated in the direction B2 and reaches the open position, and the inlet shutter 11 is rotated in the direction B2 together with the discharge shutter 95 and reaches the toner inlet position. The opening portion 951 of the discharge shutter 95 is aligned with the toner discharge hole 914 of the main body 91. The opening portion 11*b* of the inlet shutter 11 is aligned with the opening portion 951 of the discharge shutter 95 and the inlet hole 12 of the mounting portion 10, and toner may be supplied from the toner refill cartridge 9 to the developing device 2 via the mounting portion 10. The controller 500 may rotate the agitating member 96 by continuously driving the driving motor 720 in the forward direction FD. The rotation power of the driving motor 720 in the forward direction FD is transmitted to the agitating member 96 through the rotation power transmitting member 710, and while the agitating member 96 is rotated, fluidity of toner in the main body 91 is increased, and thus, the toner may be easily discharged from the main body 91.

If the controller 500 determines (S160) that the refilling of the developing device 2 has not completed, the controller 500 may determine (S170) whether refilling is being performed normally during the refilling. For example, the controller 500 may detect whether a remaining amount of the toner in the developing device 2 is greater than the reference remaining amount, using the toner remaining amount sensor 800 after a certain period of time is elapsed from when the refilling was initiated. The remaining amount of the toner in the developing device 2 may be, for example, identified from an output signal of the toner remaining amount sensor 800. The toner remaining amount sensor 800 may generate a high (H) signal when the remaining amount of the toner in the developing device 2 is less than the reference remaining amount, and the toner remaining amount sensor 800 may generate a low (L) signal when the remaining amount of the toner in the developing device 2 is greater than the reference remaining amount. When the output signal of the toner remaining amount sensor 800 is the L signal after the certain period of time has elapsed after the refilling was initiated, the controller 500 may determine that the refilling is being performed normally. When the output signal of the toner remaining amount sensor 800 is the H signal after the certain period of time is elapsed after the refilling was initiated, the controller 500 may determine that the refilling is not being performed normally. In the latter case, the controller 500 may operate the pop-up module 600 to pop up (S190) the toner refill cartridge 9 from the mounting portion 10. The controller 500 may display a non-refillable state via the user interface 1-2 (S175). For example, a text, image, symbol, or the like indicating the non-refillable state may be displayed via the display 1-2*a*. For example, the lighting apparatus 1-2*b* may be turned on in a first color, for example, a red color. For example, a signal sound notifying that refilling is impossible may be generated via the beeper 1-2*c*.

The controller 500 determines whether the refilling with the toner is completed (S160). Whether the refilling with the toner is completed may be detected by various methods. For example, the controller 500 may detect whether the refilling with the toner is completed from a driving time of the driving motor 720 that drives the toner refill cartridge 9. For example, the controller 500 may detect whether the refilling with the toner is completed from the total number of rotations of the driving motor 720. For example, the controller 500 may detect whether the refilling with the toner is completed from the toner discharge completion signal transmitted from the third electrical contact point of the memory unit 99 provided in the toner refill cartridge 9.

When it is determined that the refilling with the toner of the developing device 2 is completed, the controller 500 closes the discharge shutter 95 and the inlet shutter 11 prior to popping the toner refill cartridge 9 from the mounting portion 10. For example, the controller 500 drives the driving motor 720 in the reverse direction RD in states shown in FIGS. 11 and 13. The discharge shutter 95 and the inlet shutter 11 are rotated in the direction B1, and respectively returned to the closed position and the toner blocking position as shown in FIGS. 10 and 12.

The controller 500 causes the toner refill cartridge 9 to pop up (S190) from the mounting portion 10 by pushing the toner refill cartridge 9 in a direction opposite to the mounting direction M1, that is, the removal direction M2, by driving the pop-up module 600. For example, the controller 500 moves the releasing lever 630 from the standby position to the releasing position as shown in FIG. 5 by driving the actuator 640. The elastic hook 98 is pressed by the releasing lever 630 reaching the releasing position and elastically deformed inwardly, and accordingly, the elastic hook 98 is released from the locking step 14. While the pop-up member 610 is pushed in the removal direction M2 by an elastic force of the elastic member 620, the toner refill cartridge 9 is pushed in the removal direction M2. The pop-up member 610 reaches the pop-up position as shown in FIG. 6. The controller 500 may return the releasing lever 630 to the standby position by driving the actuator 640. Referring to FIG. 1, a length H2 of a portion of the toner refill cartridge 9 exposed from the housing 1-1 in a popped-up state is greater than a length H1 thereof in a mounted state. Thus, a user may visually recognize that refilling with the toner is completed and the toner refill cartridge 9 may be removed from the mounting portion 10. The toner refill cartridge 9 may be removed from the mounting portion 10 and the communicating hole 8 by pulling the toner refill cartridge 9 in the removal direction M2.

Figure 15:
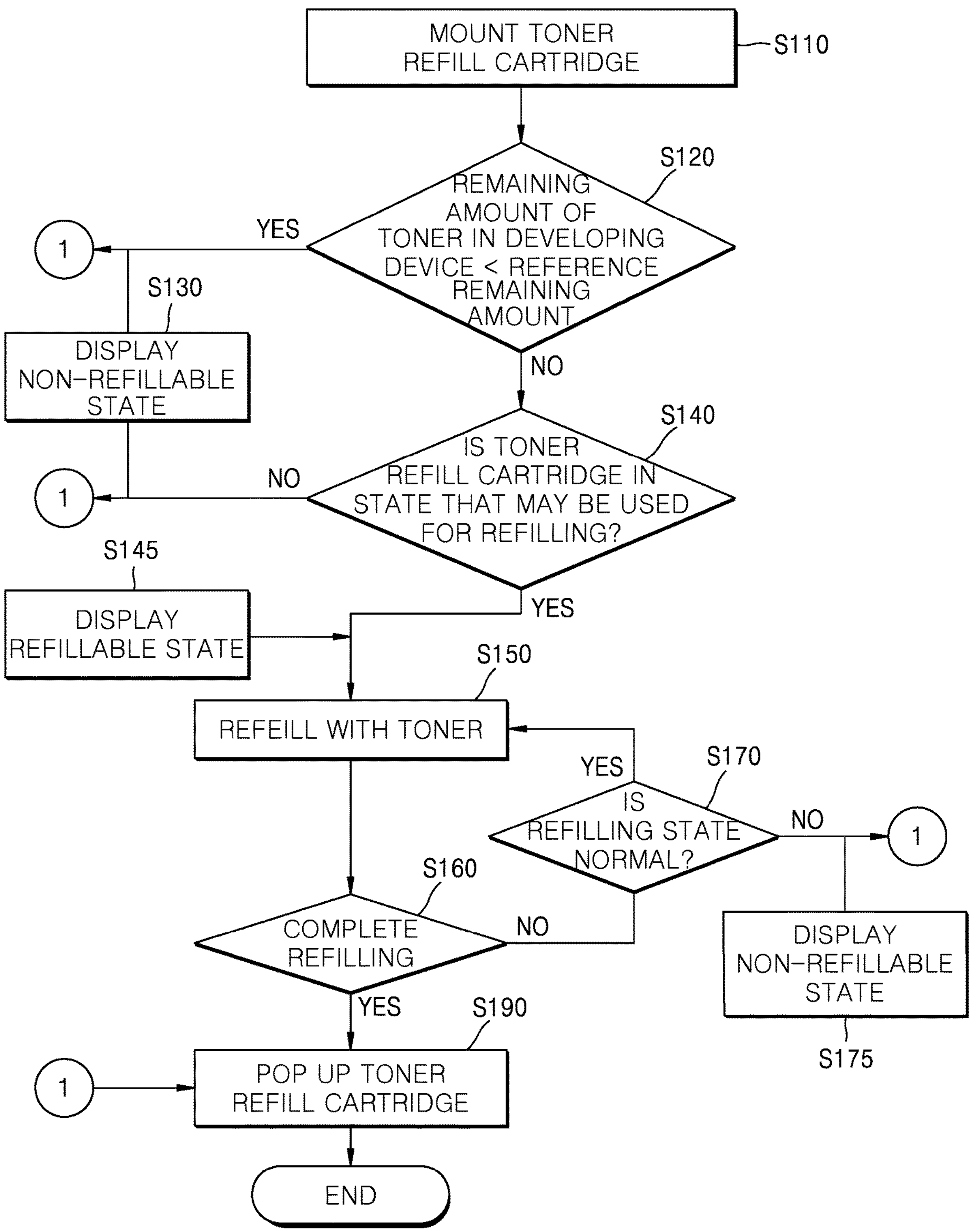
FIG. 15 is a flowchart showing an example of a method of controlling an image forming apparatus.

FIG. 15 is a flowchart showing an example of a method of controlling an image forming apparatus. Referring to FIG. 15, an example of a method of controlling an image forming apparatus may include, prior to the refilling (S150), identifying (S120) a remaining amount of the toner in the developing device 2. The remaining amount of the toner in the developing device 2 may be identified from an output signal of the toner remaining amount sensor 800. The controller 500 may determine that, when the output signal of the toner remaining amount sensor 800 is, for example, a low signal, the remaining amount of the toner in the developing device 2 is greater than the reference remaining amount. In this case, the controller 500 may perform an operation to cause the toner refill cartridge 9 to pop up (S190) from the mounting portion 10 by driving the pop-up module 600. The controller 500 may display (S130) a non-refillable state through the user interface 1-2, for example, the display 1-2*a*, the lighting apparatus 1-2*b*, and/or the beeper 1-2*c*.

The controller 500 may perform, when the output signal of the toner remaining amount sensor 800 is a high signal, that is, when the remaining amount of the toner in the developing device 2 is less than the reference remaining amount, identifying (S140) suitability of the toner refill cartridge 9. The suitability refers to whether the toner refill cartridge 9 is a toner refill cartridge that may be used to refill the developing device 2 mounted on the main body 1 of the image forming apparatus with toner. For example, the controller 500 may obtain information about the toner refill cartridge 9 from an electrical signal transmitted through the second electrical contact point from the memory unit 99 of the toner refill cartridge 9, and may identify the suitability of the toner refill cartridge 9 from the information. The suitability may include, for example, whether the toner refill cartridge 9 is a toner refill cartridge that accommodates toner usable in the main body 1 of the image forming apparatus, whether the toner refill cartridge 9 has already been used, or the like. When the toner refill cartridge 9 is not suitable, the controller 500 may cause the toner refill cartridge 9 to pop up by driving the pop-up module 600. In this case, the controller 500 may display (S130) a non-refillable state through the user interface 1-2, for example, the display 1-2*a*, the lighting apparatus 1-2*b*, and/or the beeper 1-2*c*. When the toner refill cartridge 9 is suitable, the controller 500 may perform, as described above, supplying toner from the toner refill cartridge 9 to the developing device 2 (S150). In this case, the controller 500 may display (S145) a refillable state through the user interface 1-2, for example, the display 1-2*a*, the lighting apparatus 1-2*b*, and/or the beeper 1-2*c*. For example, the controller 500 may display a text, image, symbol, or the like indicating that refilling is being performed on the display 1-2*a*. For example, the controller 500 may turn on the lighting apparatus 1-2*b* in a second color, for example, a green color. When the refilling is completed, the controller 500 switches the discharge shutter 95 and the inlet shutter 11 to the closed position and the toner blocking position, respectively, by driving the cartridge driving module 700, and pops up the toner refill cartridge 9 from the mounting portion 10 by driving the pop-up module 600.

Figure 16:
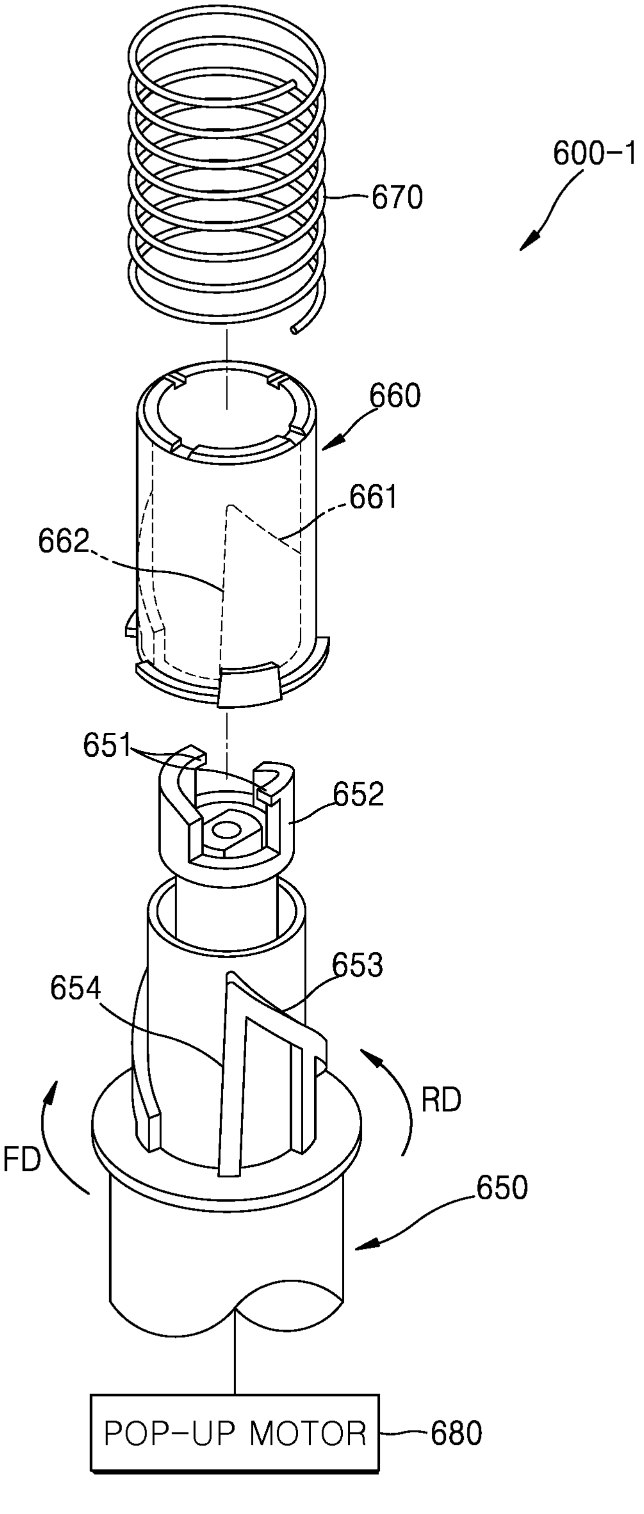
FIG. 16 is an exploded perspective view of an example of a pop-up module.
Figure 17:
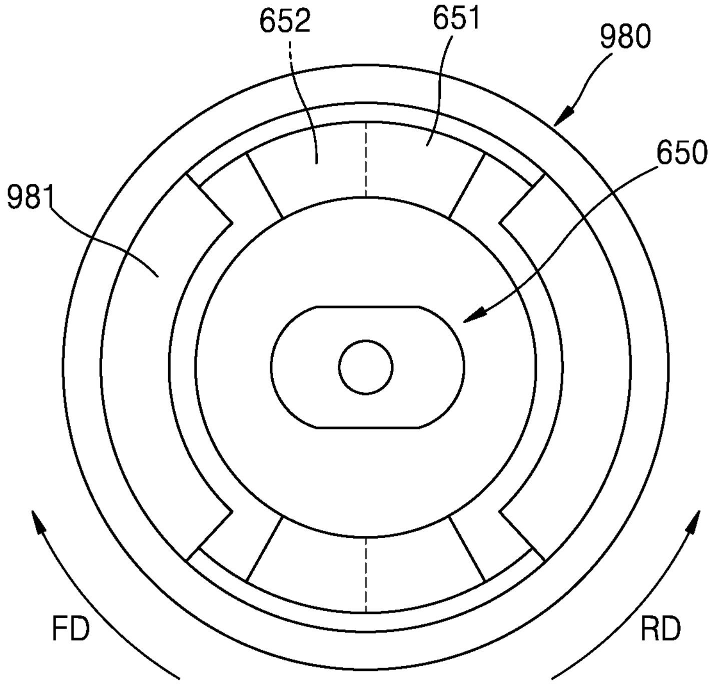
FIGS. 17 and 18 are plan views showing a state in which a locking member is in a second position and a first position, respectively.
Figure 18:
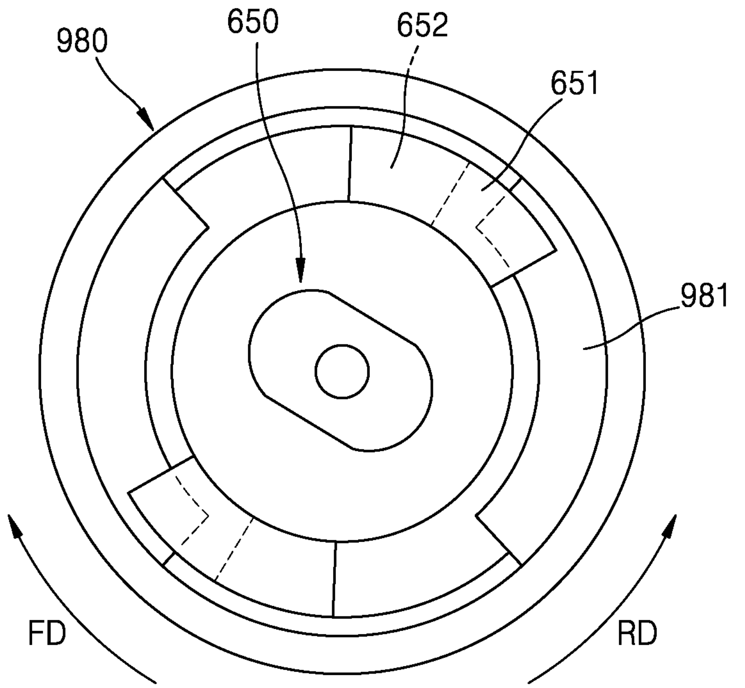
Figure 19:
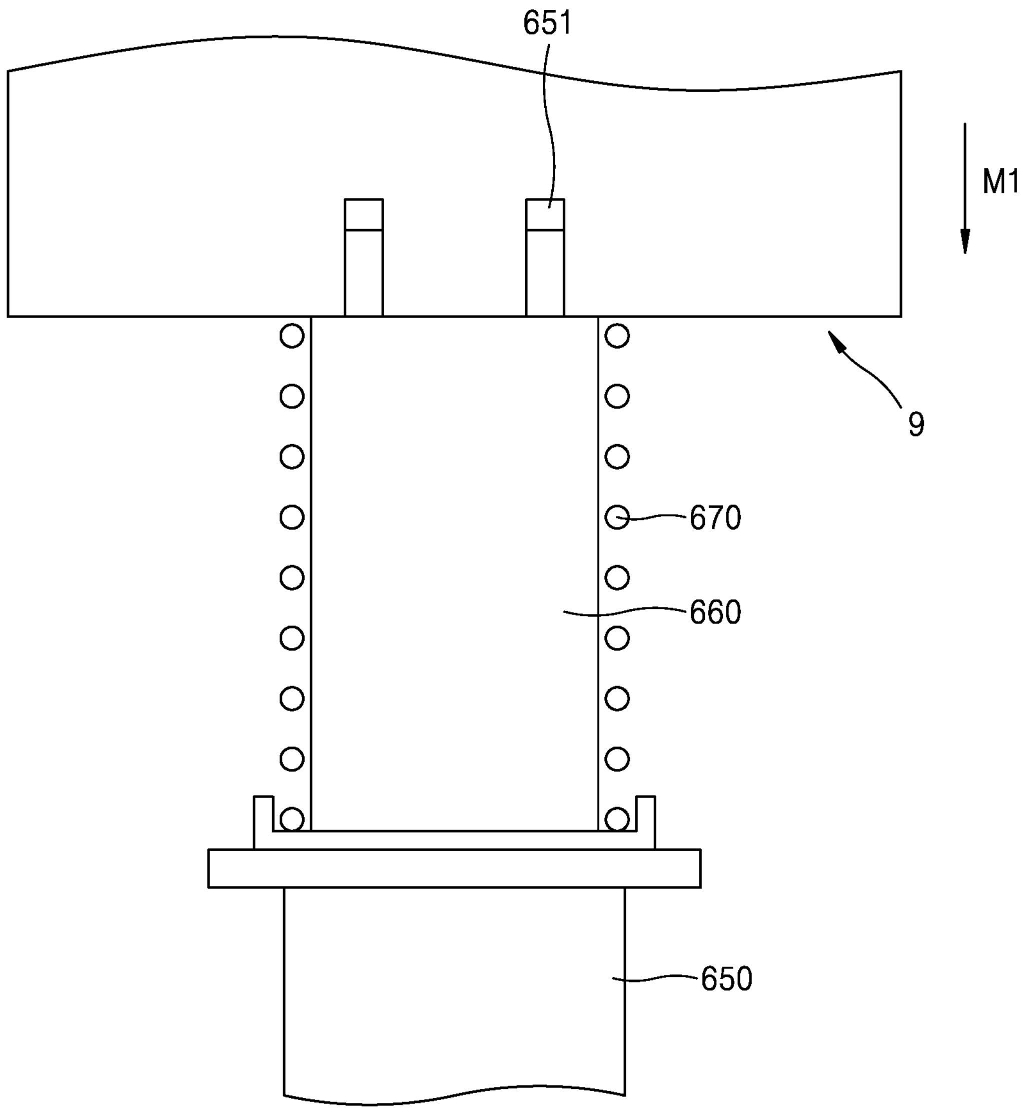
FIGS. 19 and 20 are side views showing operations of an example of the pop-up module illustrated in FIG. 16, where
Figure 20:
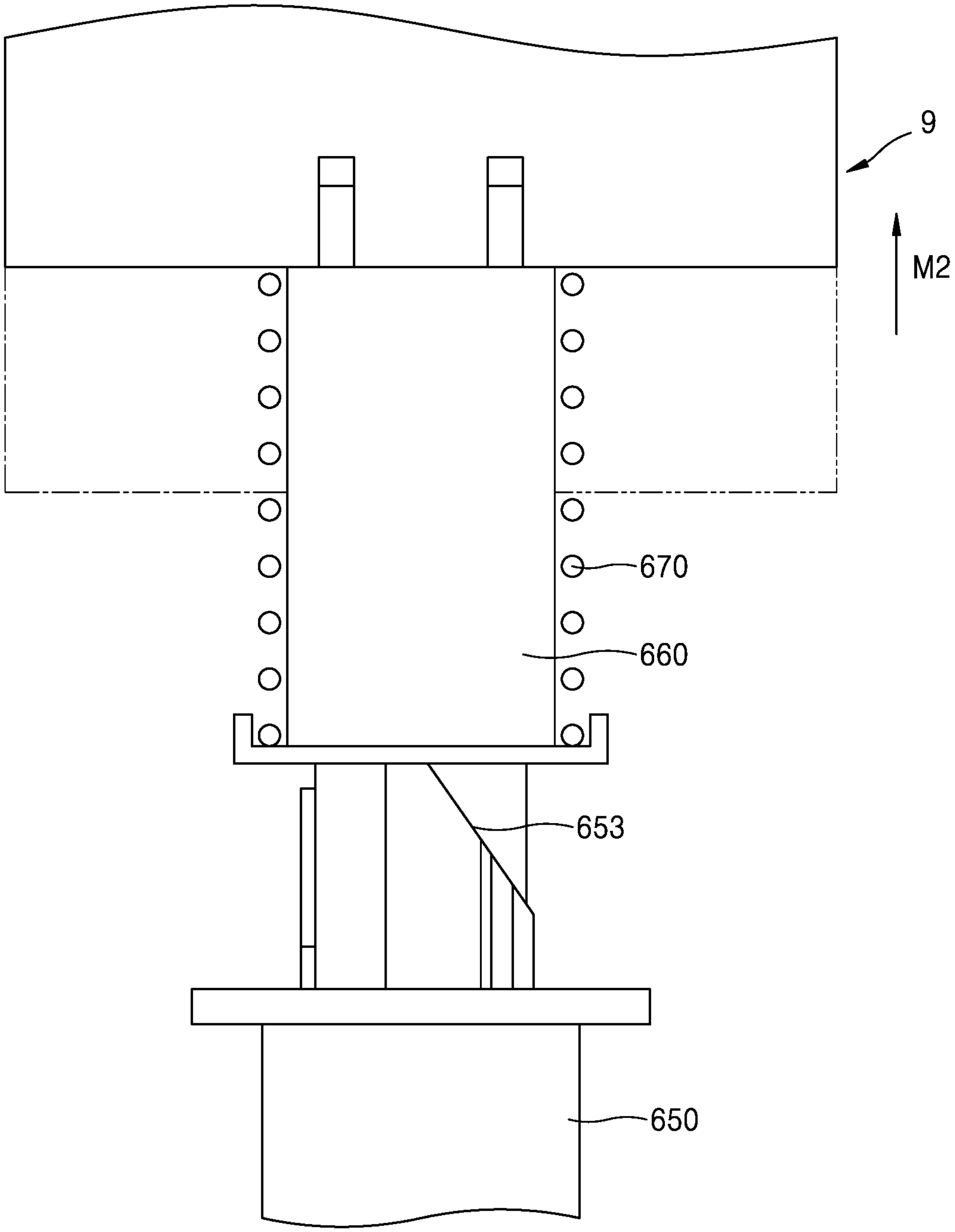

FIG. 16 is an exploded perspective view of an example of a pop-up module 600-1. FIGS. 17 and 18 are plan views showing a state in which a locking member 650 is located in a second position and a first position, respectively. FIGS. 19 and 20 are side views showing operations of an example of the pop-up module 600-1 illustrated in FIG. 16, wherein FIG. 19 shows a state in which the toner refill cartridge 9 is mounted on the mounting portion 10, and FIG. 20 shows a state in which the toner refill cartridge 9 is popped up. First, referring to FIG. 16, the locking member 650 and a pop-up motor 680 are shown. The pop-up motor 680 rotates the locking member 650. An end portion of the locking member 650 is provided with a first locking portion 651. For example, the end portion of the locking member 650 is provided with an extended portion 652 extending in an axial direction, and the first locking portion 651 may be formed by extending from an end portion of the extended portion 652 in a circumferential direction.

Referring to FIGS. 17 and 18, the toner refill cartridge 9 may be provided with a locking member 980 including a second locking portion 981. The locking member 980 is provided in the toner refill cartridge 9 to face the mounting portion 10 as shown by dashed lines in FIGS. 12 and 13, and may be exposed via the incised portion 11*c* provided in the inlet shutter 11. The locking member 650 may be rotated to the first position (in FIG. 18) where the first locking portion 651 is caught by the second locking portion 981 provided in the toner refill cartridge 9 to lock the toner refill cartridge 9 to the mounted position mounted on the mounting portion 10. The locking member 650 may be rotated to the second position (in FIG. 17) where the first locking portion 651 is released from the second locking portion 981 to allow pop-up of the toner refill cartridge 9.

Referring back to FIG. 16, the pop-up module 600-1 may push and pop up the toner refill cartridge 9 in the removal direction M2 when the pop-up motor 680 is driven in a reverse direction. An example of the pop-up module 600-1 may include a pop-up member 660 supported by the locking member 650 to be elevated or dropped in the removal direction M2, and a first inclined portion 653 and a second inclined portion 661 respectively provided in the locking member 650 and the pop-up member 660 so that the pop-up member 660 is pushed in the removal direction M2 when the pop-up motor 680 is driven in the reverse direction. The pop-up member 660 may be elevated or dropped to an accommodation position where the toner refill cartridge 9 located in the mounted position is supported, and to a pop-up position where the toner refill cartridge 9 is popped up. The elastic member 670 applies an elastic force to the pop-up member 660 in the mounting direction M1, that is, a direction moving to the accommodation position. First and second facing portions 654 and 662 respectively provided in the locking member 650 and the pop-up member 660 face each other so that the locking member 650 and the pop-up member 660 are rotated together when the pop-up motor 680 is driven in a forward direction.

When the toner refill cartridge 9 is mounted on the mounting portion 10 as shown in FIG. 19, the locking member 980 of the toner refill cartridge 9 is exposed toward the mounting portion 10 as shown by dashed lines in FIG. 12. The extended portion 652 and the first locking portion 651 of the locking member 650 are inserted into the locking member 980 as shown in FIG. 17 via the incised portion 11*c* provided in the inlet shutter 11. The first locking portion 651 is located in the second position spaced apart from the second locking portion 981. The pop-up member 660 is located in the accommodation position as shown in FIG. 19 and supports the toner refill cartridge 9 located in the mounted position. In this state, when the pop-up motor 680 is driven, for example, in the forward direction, the locking member 650 is rotated in the forward direction FD. As shown in FIG. 18, the first locking portion 651 enters above the second locking portion 981, that is, in the removal direction M2 of the second locking portion 981, and the locking member 650 is located in the first position. In this state, even when a force is applied to the toner refill cartridge 9 in the removal direction M2, the second locking portion 981 is caught by the first locking portion 651, and thus, the toner refill cartridge 9 is not removed. Thus, the toner refill cartridge 9 may be locked to the mounted position. When the locking member 650 is rotated in the forward direction FD, the pop-up member 660 is rotated in the forward direction FD together with the locking member 650 in the accommodation position.

In states shown in FIGS. 18 and 19, the locking member 650 may be rotated in the reverse direction RD by driving the pop-up motor 680 in the reverse direction. Then, as shown in FIG. 17, the locking member 650 is returned to the second position, the first locking portion 651 deviates from the second locking portion 981, and the locking of the toner refill cartridge 9 is released. In this state, the toner refill cartridge 9 may be popped up by applying a force to the toner refill cartridge 9 in the removal direction M2, or may be removed from the mounting portion 10. When the locking member 650 continues to be rotated in the reverse direction RD, the first inclined portion 653 pushes the second inclined portion 661 in the removal direction M2. The pop-up member 660 pushes the toner refill cartridge 9 in the removal direction M2 while moving in the removal direction M2 with respect to the locking member 650. Because the locking of the toner refill cartridge 9 is released, the toner refill cartridge 9 may be moved in the removal direction M2. When the pop-up member 660 reaches the pop-up position as shown in FIG. 20, the pop-up of the toner refill cartridge 9 is completed.

Figure 21:
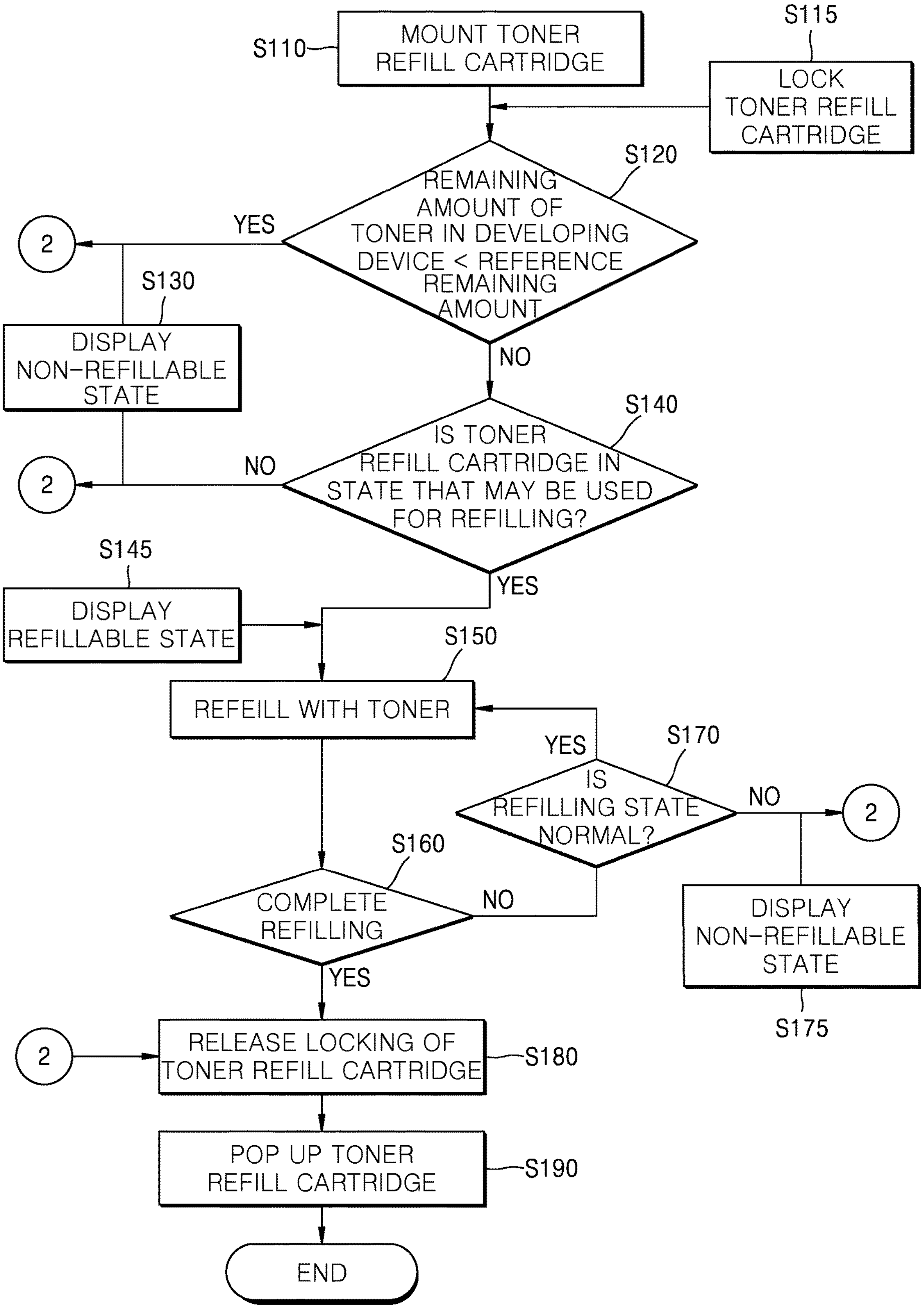
FIG. 21 is a flowchart showing an example of a method of controlling an image forming apparatus.

FIG. 21 is a flowchart showing an example of a method of controlling an image forming apparatus. The method of the present examples differs from the example of the method shown in FIG. 15 in that locking (S115) of the toner refill cartridge 9 and releasing (S180) the locking of the toner refill cartridge 9 are included. Hereinafter, differences between the controlling method of the present example and the controlling method shown in FIG. 15 are mainly described.

The toner refill cartridge 9 may be mounted on the mounting portion 10 by being inserted into the communicating hole 8 provided in the main body 1 and pushed in the mounting direction M1. As shown in FIG. 12, the discharge shutter 95 of the toner refill cartridge 9 and the inlet shutter 11 of the mounting portion 10 are engaged with each other. As shown in FIG. 17, the extended portion 652 and the first locking portion 651 of the locking member 650 are inserted into the locking member 980, and the first locking portion 651 is located in the second position spaced part from the second locking portion 981. As shown in FIG. 19, the pop-up member 660 is located in the accommodation position, and supports the toner refill cartridge 9 located in the mounted position.

The memory unit 99 of the toner refill cartridge 9 is electrically connected to the connecting portion 13 provided in the mounting portion 10, and for example, may transmit, to the controller 500, an electrical signal indicating that the toner refill cartridge 9 is mounted on the mounting portion 10 via the first electrical contact point. The controller 500 may lock the toner refill cartridge 9 to the mounting portion 10 by driving the pop-up module 600-1. The controller 500 rotates the locking member 650 in the forward direction FD by, for example, driving the pop-up motor 680 in the forward direction. Then, as shown in FIG. 18, the first locking portion 651 enters above the second locking portion 981, and the locking member 650 is located in the first position to lock the toner refill cartridge 9 in the mounted position mounted on the mounting portion 10.

When a remaining amount of a toner in the developing device 2 is greater than a reference remaining amount (as determined at S120), when the toner refill cartridge 9 is not in a state for refilling in operation S140, when it is not determined that a refilling state is normal in operation S170, and when refilling is completed in operation S160, releasing locking of the toner refill cartridge 9 (S180) is performed. In operation S180, the controller 500 may rotate the locking member 650 in the reverse direction RD by driving the pop-up motor 680 in the reverse direction. Then, as shown in FIG. 17, the locking member 650 is returned to the second position, the first locking portion 651 deviates from the second locking portion 981, and the locking of the toner refill cartridge 9 is released. When the locking member 650 continues to be rotated in the reverse direction RD, the first inclined portion 653 pushes the second inclined portion 661 in the removal direction M2. The pop-up member 660 pushes the toner refill cartridge 9 in the removal direction M2 while moving in the removal direction M2 with respect to the locking member 650. Because the locking of the toner refill cartridge 9 is released, the toner refill cartridge 9 may be moved in the removal direction M2. When the pop-up member 660 reaches the pop-up position as shown in FIG. 20, the pop-up of the toner refill cartridge 9 is completed. The toner refill cartridge 9 may be removed from the mounting portion 10 by pulling the toner refill cartridge 9 in the removal direction M2.

It should be understood that examples described herein should be considered in a descriptive sense only and not for purposes of limitation. Descriptions of features or aspects within each example should typically be considered as available for other similar features or aspects in other examples. While one or more examples have been described with reference to the figures, it will be understood by those of ordinary skill in the art that various changes in form and details may be made therein without departing from the spirit and scope as defined by the following claims.

What is claimed is:

1. A method of controlling an image forming apparatus, the method comprising:

while a toner refill cartridge is mounted on a mounting portion of a main body of the image forming apparatus, refilling a developing device with a toner from the toner refill cartridge by driving a driving motor; and in response to the refilling of the developing device with the toner from the toner refill cartridge being completed, popping up the toner refill cartridge from the mounting portion by pushing the toner refill cartridge in a direction opposite to a mounting direction of the toner refill cartridge onto the mounting portion.

2. The method of claim 1, wherein the toner refill cartridge is mounted on the mounting portion through a communicating hole provided in a housing, and a length of a portion of the toner refill cartridge exposed from the housing in a popped-up state of the toner refill cartridge is greater than a length of the portion of the toner refill cartridge exposed from the housing in a mounted state of the toner refill cartridge.

3. The method of claim 1, further comprising:

prior to performing the refilling, locking the toner refill cartridge to the mounting portion; and prior to performing the popping up, releasing the locking of the toner refill cartridge.

4. The method of claim 1, further comprising, prior to performing the popping up, closing a discharge shutter of the toner refill cartridge and an inlet shutter of the mounting portion by driving the driving motor in a reverse direction.

5. The method of claim 1, further comprising:

prior to the refilling, identifying a remaining amount of the toner in the developing device; and in response to the identified remaining amount of the toner being greater than a reference remaining amount, popping up the toner refill cartridge from the mounting portion.

6. The method of claim 5, further comprising, in response to the identified remaining amount of the toner being greater than the reference remaining amount, displaying a non-refillable state in a user interface.

7. The method of claim 5, further comprising:

in response to the identified remaining amount of the toner being less than the reference remaining amount, determining a suitability of the toner refill cartridge;

in response to the toner refill cartridge being determined to be unsuitable, popping up the toner refill cartridge from the mounting portion; and in response to the toner refill cartridge being determined to be suitable, supplying the toner from the toner refill cartridge to the developing device.

8. The method of claim 7, further comprising, in response to the toner refill cartridge being determined to be suitable, displaying a refillable state in a user interface.

9. The method of claim 7, wherein the supplying of the toner comprises:

opening a discharge shutter of the toner refill cartridge and an inlet shutter of the mounting portion by driving the driving motor in a forward direction; and rotating an agitating member of the toner refill cartridge by driving the driving motor in the forward direction.

10. An image forming apparatus comprising:

a main body comprising a developing device, and a mounting portion to or from which a toner refill cartridge is attachable or detachable, wherein the mounting portion is connected to the developing device to transfer a toner in the toner refill cartridge to the developing device, and wherein the main body comprises a housing including a communicating hole so that the toner refill cartridge is mountable on the mounting portion from outside the main body;

a pop-up module to push and pop up the toner refill cartridge in a removal direction; and a controller to cause the toner refill cartridge to pop up from the mounting portion by operating the pop-up module in response to a refilling of the developing device with the toner from the toner refill cartridge being completed.

11. The image forming apparatus of claim 10, wherein a length of a portion of the toner refill cartridge exposed from the housing in a popped-up state of the toner refill cartridge is greater than a length of the portion of the toner refill cartridge exposed from the housing in a mounted state of the toner refill cartridge.

12. The image forming apparatus of claim 10, further comprising a locking step to catch an elastic hook of the toner refill cartridge when the toner refill cartridge is mounted on the mounting portion, the catching of the elastic hook by the locking step to lock the toner refill cartridge in a mounted position, wherein the pop-up module comprises:

a pop-up member provided in the mounting portion and movable between an accommodation position where the toner refill cartridge located in the mounted position is supported, and a pop-up position where the toner refill cartridge is pushed in the removal direction;

an elastic member to apply, to the pop-up member, an elastic force in a direction toward the pop-up position;

a releasing lever moveable between a standby position and a releasing position where the elastic hook is released from the locking step; and an actuator to drive the releasing lever.

13. The image forming apparatus of claim 10, further comprising: 28 a locking member comprising a first locking portion and rotatable between a first position where the first locking portion is caught by a second locking portion provided in the toner refill cartridge to lock the toner refill cartridge in a mounted position mounted on the mounting portion, and a second position where the first locking portion is released from the second locking portion to allow the toner refill cartridge to be popped up; and a pop-up motor to rotate the locking member, wherein the controller is to cause rotation of the locking member to the first position and the second position by rotating the pop-up motor in a forward direction and a reverse direction, respectively.

14. The image forming apparatus of claim 13, wherein the pop-up module is to pop up the toner refill cartridge from the mounting portion by pushing the toner refill cartridge in the removal direction in response to the pop-up motor being rotated in the reverse direction.

15. The image forming apparatus of claim 14, wherein the pop-up module comprises:

a pop-up member supported by the locking member to be elevated or dropped in the removal direction; and first and second inclined portions respectively provided in the locking member and pop-up member so that the pop-up member is pushed in the removal direction in response to the pop-up motor being rotated in the reverse direction.

* * * * *